US012604896B2

(12) United States Patent
Noriega Vaca et al.

(10) Patent No.: US 12,604,896 B2
(45) Date of Patent: Apr. 21, 2026

(54) MIXTURE OF LEVONOGESTREL AND ETHINYLESTRADIOL AS CONTROL FOR BARK INSECTS

(71) Applicants: Alfredo Alejandro Noriega Vaca, Mexico City (MX); Manuel José Grañén Porrúa, Mexico City (MX)

(72) Inventors: Alfredo Alejandro Noriega Vaca, Mexico City (MX); Manuel José Grañén Porrúa, Mexico City (MX)

( * ) Notice: Subject to any disclaimer, the term of this patent is extended or adjusted under 35 U.S.C. 154(b) by 639 days.

(21) Appl. No.: 18/004,837

(22) PCT Filed: May 27, 2021

(86) PCT No.: PCT/MX2021/050025

§ 371 (c)(1),
(2) Date: Jan. 9, 2023

(87) PCT Pub. No.: WO2022/015144

PCT Pub. Date: Jan. 20, 2022

(65) Prior Publication Data

US 2023/0255207 A1 Aug. 17, 2023

(30) Foreign Application Priority Data

Jul. 13, 2020 (MX) .................... MX/a/2020/005871

(51) Int. Cl.

| | |
|---|---|
| ***A01N 45/00*** | (2006.01) |
| ***A01P 7/04*** | (2006.01) |
| ***A01P 17/00*** | (2006.01) |

(52) U.S. Cl.
CPC ................ *A01N 45/00* (2013.01); *A01P 7/04* (2021.08)

(58) Field of Classification Search
None
See application file for complete search history.

(56) References Cited

U.S. PATENT DOCUMENTS

| | | | |
|---|---|---|---|
| 2009/0117183 | A1 | 5/2009 | Fricke et al. |
| 2019/0183126 | A1 | 6/2019 | Gries et al. |

FOREIGN PATENT DOCUMENTS

| | | |
|---|---|---|
| MX | 2018008189 | 12/2019 |

OTHER PUBLICATIONS

Dando et al., abstract 2004, Treatments in Endocrinology, 3(5), 319-324.*
Kwiecien et al., 2003, Contraception, 67(1), 9-13.*
Gochez-López, Emmanuel et al.; Insecticidas sistemicos para el control de Dendroctonus adjuntus Blandford, 1897 en El Nevado de Toluca. Revista Mexicana de Ciencias Forestales 2015, vol. 6, No. 27; p. 50-63.
International Application No. PCT/MX2021/050025—Patent Cooperation Treaty PCT International Search Report—Completed Sep. 21, 2021 (mailed Sep. 22, 2021).
International Application No. PCT/MX2021/050025—Patent Cooperation Treaty PCT Written Opinion of the International Searching Authority—Completed Sep. 21, 2021 (mailed Sep. 22, 2021).

* cited by examiner

*Primary Examiner* — Sun Jae Yoo
(74) *Attorney, Agent, or Firm* — Lott & Fischer, PL

(57) ABSTRACT

Bark beetles of the genus *Dendroctonus* are the main cause of deterioration of pine forests in Mexico, causing a negative ecological, economic, and social impact. The repellent effect of the mixture of levonorgestrel and ethinylestradiol on *Dendroctonus frontalis* and *D. mexicanus* in pine trees was determined in this study.

4 Claims, 17 Drawing Sheets

MIXTURE OF LEVONOGESTREL AND ETHINYLESTRADIOL AS CONTROL FOR BARK INSECTS

FIELD OF THE INVENTION

Hormone blend, specifically: Levonorgestrel and Ethynilestradiol for debarking insect control.

| Composition of the mixture: | | |
|---|---|---|
| | Minimum range | Maximum range |
| Levonorgestrel | 0.45 mg | 0.60 mg |
| Ethynilestradiol | 0.09 mg | 0.12 mg |
| Exipient CHP | 1 tablet | 1 tablet |

Chemical formula:

Levonorgestrel:
Chemical formula:
Formula: $C_{21}H_{28}O_2$
Molecular weight: 312.446 g/mol

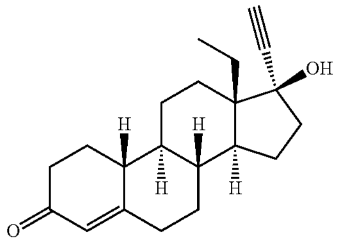

Ethynilestradiol:
Chemical formula:
Formula: $C_{20}H_{24}O_2$
Molecular weight: 296.403 g/mol

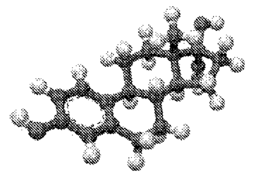

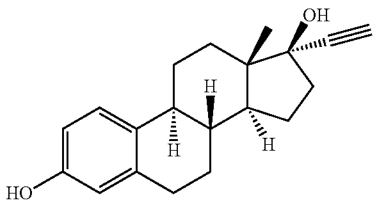

BACKGROUND OF THE INVENTION

Genus *Pinus*

In Mexico, the genus *Pinus* is of great ecological, economic, and social importance. Its economic value is high because it is a source of wood, firewood, pulp, resin, and seeds. It supports forestal industry and provides environtmental services, as it influences regional climate (Ramirez-Herrera et al., 2005; Sánchez-González, 2008). Most of its species are limited to certain geographical ranges (Woodward, 1987), in which climate and soil are the main factors that delimit their distribution (Dawson y Spannagle, 2009). Climate change and anthropogenic activity (Peterson et al., 2006), give rise to modifications in phenology, growth, and even population dynamics (Parmesan, 2006) as well as the distribution intervals of many species (Walther, 2010).

In Mexico, conifers are present in various types of vegetation. According to Rzedowski (1978) they are found in pine forest, pine scrub, Abies pine forest, Pseudotsuga and Picea forest, Juniperus forest or scrub, and Cupressus forest. In addition, they inhabit other types of vegetation such as mountain mesophilic forest, mixed forest (e.g., pine-oak forest), xerophytic scrub and gallery forest.

With this, Mexico is considered a secondary center of diversification of the genus *Pinus* (FIG. 2), with 49 (40%) of the approximately 120 species in the world, and of which 22 are endemic (David S. Gernandt and Jorge A. Pérez-de la Rosa, 2014).

At present forest area is seriously affected by problems such as deforestation, changes in land use, human settlements, natural disasters, pests, and diseases etc. In 2016 FAO stated that during the period from 1990 to 2015 forest area fell by 3.1%, that is 129 million hectares have been lost, leaving a total of 4,000 million (FAO, 2016).

Mexican forests face fires, excessive logging (Salinas et al., 2010), pests and diseases. The cone and seed borers stand out (Cibrián et al., 1998), defoliators (Castro, 1981), such as genus Neodiprion and Zadiprion (González et al., 2014); mistletoe, which have caused annual losses of more than two million cubic metres of wood (Vázquez et al., 2006) and debarkers, mainly of the genus *Dendroctonus*, of which there are 13 species (Armendáriz and Zúñiga, 2017); for their aggressiveness, these stand out: *Dendroctonus frontalis* Zimmermann, *Dendroctonus mexicanus* Hopkins, *Dendroctonus adjuntus* Blandford and *Dendroctonus rhizophagus* Thomas & Bright, which are fundamental in the dynamics and natural renewal of forests (Salinas et al., 2010).

From 1990 to 2014, 474 thousand hectares were registered in Mexico (5% of the total) as being affected by debarkers, of which only 60%, on average, received some control or management practice (Semarnat, 2015); which can be explained by the uncertainty of the potential of forests affected by such agents.

One of the main factors that determine the attack of pests is due to the severity of droughts and temperature change, which keeps the tree under stress and makes it vulnerable to insect attack (Raffa et al., 2008; Del Val and Sáenz, 2017). Specifically, for debarkers, low temperatures are an important element in their distribution, as are other direct effects on the insects, by promoting the mortality of adults and larvae, as well as altering the time required to complete a generation. However, due to climate change and the increase in temperature, the limiting relation towards insects could gradually decrease and cause an explosion in population (Hernández et al., 2017).

Overall, in the context of pests, the outlook for temperate forests in Mexico, is not very encouraging. On the one hand, bark insects are positively influenced by rising temperatures (Del Val and Sáenz, 2017), which leads to an increase in the number of generations per year (Bentz et al., 2010); with this, their possibilities to adapt to new environmental conditions, multiply. Trees, on the other hand, do not have the same ability to adjust to changes that involve the massive presence of insects, nor those of their environment.

Historically, the largest outbreaks of debarkers in Mexico, have occurred in the Trans-Mexican Volcanic Belt, an area that coincides with the greatest diversity of pines, but not with the greatest diversity of pine species debarkers of the genus *Dendroctonus* (Salinas-Moreno et al., 2010).

*Dendroctonus*

Forest pests are insects that cause mechanical or physiological damage to trees, such as deformations, decreased growth, and can even lead to death (Escobar, 2012). On a large scale these can lead to the destruction of forest ecosystems, economic losses, and ecological consequences especially erosion (Nikolov, et al., 2014).

In Mexico, during the period from 2003 to 2011, the states that were most affected by the presence of forest pests and diseases were: Chihuahua, Nuevo León, Jalisco, Nayarit, Veracruz, and Quintana Roo. While Morelos and Chiapas were the least affected (CONANP, 2012).

The area affected annually by forest pests and diseases is 43,551 hectares; debarker insects cause about 39.8% of affectation (Arriola, et. to the. 2015).

The Scolytidae family contains more than 500 species worldwide. This family is divided into two groups according to their feeding habit: ambrosial beetles, which are wood borers, and bark beetles, which feed on phloem (Coulson and Witter, 1990).

The genus *Dendroctonus* is one of the main mortality factors during development and establishment of forests and plantations. These organisms cause the death of thousands of trees causing a serious ecological imbalance (Rodriguez et al., 2010).

These debarkers play a fundamental ecological role since they are one of the main factors of renewal and natural sanitation of forest communities. They are considered forest pests due to the significant mortality they cause, as well as the economic losses they provoke in the entire forestry sector (Salinas et al., 2010).

In Mexico this genus is distributed from the Sierra Baja de California, Sierra Madre Occidental, Sierra Madre Oriental, the Trans-Mexican Volcanic Belt, Sierra Madre del Sur, to the Sierra de Chiapas. Its altitudinal ranges are between 1700 and 2500 in. However, a remarkably wide altitudinal range is notable (600 to about 4 000 in) (Salinas, et al., 2010).

Globally, Mexico's forests have the greatest diversity of bark beetles of the genus *Dendroctonus* highlighting in importance: *Dendroctonus adjunctus, D. approximatus, D. brevicomis, D. frontalis, D. jeffreyi, D. mexicanus, D. parallelocollis, D. ponderosae, D. pseudotsugae, D. rhizophagus, D. valens* and *D. vitei*, which include a large part of the species that behave as pests, and that have affected large areas of pine forests in North America (Salinas et al., 2010).

The National Forestry Commission (CONAFOR) reported the impact of active outbreaks by bark debarking insects January to September 2016, considering the entities of Oaxaca (9,668.6 ha), Chiapas (4653.9 ha), Mexico (320.6 ha), Nuevo Leon (261.4 ha) and Coahuila (233.3 ha) as high risk.

*Dendroctonus mexicanus*. Hopkins

The geographical distribution of this species spreads from northern Mexico to Honduras (Wood 1982).

It was recently registered in the southern United States (Moser et al. 2005). It is the species with the widest distribution in Mexico's forests; however, collection records indicate that it is more common in central Mexico along the Trans-Mexican Volcanic Belt (TMVB).

Of the four primary species of *Dendroctonus* in Mexico, it is the one with the greatest amplitude in its ecological valence, as indicated by its wide altitude range and the spectrum of guests on whom its populations develop. It is common to find it coexisting with other species such as *D. frontalis* and *D. adjunctus* in the center and south of the country.

Mexico. From 1972 to 1973 it has affected 50 thousand ha in the State of Michoacán, where it destroyed 1'200,000 m3 of pine wood, and in the same year in the Federal District and State of Mexico it invaded 17 thousand ha of pine forest. From 1977 to 1978 this plague was combated in five thousand ha in the State of Mexico, Michoacán, and Federal District, within a forested area of 40 thousand ha (Sánchez et al., 2003).

*D. mexicanus* was described by Hopkins in 1905; later Wood (1963), in the revision of the genus *Dendroctonus*, stated that *D. mexicanus* is the same species that exists in the southern United States and which Zimmerman previously classified (1868) as *D. frontalis*. Subsequently, through biosystematic studies, it was determined that *D. frontalis* Zimm and *D. mexicanus* are in effect distinct species (Rodriguez, 1982).

This species of debarker is distributed (FIGS. 3 and 4) in the states of Aguascalientes Chiapas, Colima, Durango, Guerrero, Hidalgo, Jalisco, Mexico, Michoacan, Morelos, Nuevo León, Oaxaca, Puebla, Queretaro, San Luis Potosi, Sinaloa, Sonora, Tamaulipas, Tlaxcala, Veracruz, and Zacatecas, presenting an altitudinal range that goes from 1200 to 2850 in (Tkacz, et al., 1998) and (Iñiguez, 1999).

The largest regions with the best climatic conditions are located in the center and west of the TMVB between the State of Mexico and Jalisco, as well as in the portion of the Sierra Madre Occidental (SMOC) that corresponds to the state of Durango. Other favorable regions, yet smaller, are located in the mountains north of Oaxaca and the eastern portion of the TMVB and at the intersection of the southern part of the Sierra Madre Oriental (SMOR) and the TMVB, in the states of Querétaro, Tlaxcala and Puebla.

*D. mexicanus* is hosted by the following species: *Pinus ayacahuite, P. arizonica, P. cembroides, P. cooperi, P. douglasiana, P. durangensis, P. greggii, P. hartwegii, P. herrerai, P. lawsoni, P. leiophylla, P. maximinoi, P. michoacana, P. montezumae, P. patula, P. pinceana, P. pseudostrobus, P. rudis*, and *P. teocote* (Tkacz, et al., 1998). Cibrián (1995) also mentions that it attacks *P. engelmannii*, too.

The adult has an approximate length of 2.3 to 4 5 mm, its color is glossy black, presents 4 to 5 generations per year depending on the altitude of the site (Sánchez and Torres, 2007). Tkacz et al. (1998), report that at heights of 2300 to 2500 in the number of generations that occur of *D. mexicanus* are 4. The forehead of the insect is convex, presents two elevations separated by a groove that goes down through the middle of the head. The eggs are oval, of a soft and smooth consistency.

The larva has a sclerosed head, it has chewing mouthparts, its body is cylindrical, apodus, with creamy color and goes through 4 larval instars. Pupae are of exarate type, creamy white at first, then light brown and finally dark brown (Cibrián, et al., 1995).

Beetles can attack trees from 5 cm to more than 40 cm DBH (diameter at breast height), although survival and development of the larvae takes place in trees with larger diameter (Tkacz, et al., 1998).

The attack is initiated in groups, although it is really the female who drills the entrance of the gallery. From the moment it enters, it excavates a short distance gallery in an upward vertical direction that allows the resin to flow (Perry, 1991). Once the females have entered the phloem, they release fungal spores of the spotting genus *Certocystis* sp., which germinate immediately producing hyphae that go into the sapwood of the phloem. The fungi produce a mycelium that blocks the resin ducts and the water-carrying tracheids. (Cibrián et al., 1995). They also release pheromones (frontalin, brevicomin and transverbenol) that attract the male to initiate mating which occurs within the first 3 cm of the galleries (Sánchez and Torres, 2007) and (Iñiguez, 1999).

Inside an infested tree it is common to find several stages of development, especially in those trees that have yellowish green or yellowish foliage.

It is known that females can oviposit for several weeks and that eggs laid initially develop and give rise to the first generation of *D. mexicanus*. At first there may be only one infested tree and from here a spot develops, that is to say a group of attacked trees; the population of emerging adults of several generations increases the number of trees that compose it (Cibriãn, et al., 1995).

*Dendroctonus frontalis* Zimmerman

*Dendroctonus frontalis* is the main pest for pines; its distribution ranges from Pennsylvania to southern Mexico and Central America (FAO, 2009).

In our country this species is distributed in the states of Chiapas, Guerrero, Hidalgo; Mexico, Michoacán, Nuevo Leon, Oaxaca, Puebla, Queretaro, and San Luis Potosi (FIGS. 5 and 6).

*Dendroctonus frontalis* has been reported in several mountain ranges of the Northeast, Center, South, and Southeast of the country, it is frequent in areas in the north of the SMOR, the Sierra Madre del Sur (SMS) and the Sierra de Chiapas (SCH) where other species have restricted distribution. *D. frontalis* is considered a primary species that constantly provokes important epizootic diseases in forests located in the TMVB, SMS and SCH.

Despite the wide distribution of this species, the most favorable climatic conditions are located in the center of the TMVB, the forest areas of the state of Oaxaca in the SMS and in the SCH.

Its altitudinal span ranges between 600 and 3200 in; although the ideal height is 1500 to 2000 in. Among its hosts are: *Pinus devoniana, P. douglasiana, P. greggii, P. lawsonnii, P. leiophylla, P. maximinoi, P. montezumae, P. oocarpa, P. pringlei, P. pseudostrobus* and *P. teocote*. (Salinas et al; 2010).

This is the smallest species of the genus *Dendroctonus* having a length of 2 to 4 mm since the average for the genus is 3 mm. Its coloration varies from brown to black. The oviposition pattern is shaped like a serpentine or "S", it normally infests the clean shaft of the tree, from the base all the way to the treetop (Coulson and Witter, 1990).

*Dendroctonus frontalis* has a life cycle of 43 to 70 days, so it can have up to seven generations a year; the duration of the stadiums is from 3 to 11 days for the egg; 15 to 40 for the larva; 5 to 17 for the pupa and 6 to 14 days for the adult (Madaleña, 1991).

The egg is oval, somewhat elliptical, with a soft consistency, pearl-white coloration, 1.5 mm long by 1 mm wide. The larva is subcylindrical, apodus and white, it is C-shaped, with a sclerotic head and a well-developed oral apparatus. Mature larva measure 5 to 7 mm in length (Cibrian et al. 1995).

The flight months are normally during April and May until the end of September and October, during this period of time a temperature of approximately 27° C. is present which is optimal for the flight of this insect (Iñiguez, 1999).

When females in adult state settle in the tree, they release a pheromone that, combined with the smell of fresh perforations of the host, are responsible for attracting the male to initiate copulation. Usually, the attack starts in the middle portion of the shaft and continues in both upwards and downwards. The attack period varies from a few days to several weeks (Cibriãn and cabbage; 1995).

The main symptom of the presence of *D. frontalis* is the presence of lumps of sawdust along the shaft, and discoloration of the needles of the tree, starting with a yellowish coloration, and then reddish within 1 to 2 months after the attack (FAO, 2009).

Pressure from *Dendroctonus* on Pine Forests in Mexico

The historical pressure exerted by *Dendroctonus* species on pine forests in Mexico has been quantified by means of the Debarker Threat Index (DTI). The DTI refers to the levels of interaction that the six species of *Dendroctonus* of wider distribution in Mexico have maintained with their host pine species. In addition, the index is an indirect estimator of the probability of affectation (vulnerability) that pine communities can present at a site or region to attack by *Dendroctonus*, as it is based on historical records of the presence of these insects during the last hundred years. The results of this index are presented in three categories: high, medium, and low, generated by geometric intervals, as a practical way to approach their importance.

The map that summarizes the DTI values for all *Pinus* species (FIG. 7), indicates that the debarkers have maintained low pressure values on their hosts in most of the area of their geographical range, despite the fact that all three categories occur in all mountain ranges, with the exception of the SBC.

Areas with high DTI values are more common in the TMVB and SMOC, however, approximately 16 vulnerable zones, spread over the main mountain systems of the country: SMOC (3), SMOR (1), TMVB (10), SMS (1) and SCH (1) can be identified. Of these vulnerable areas, those with a greater extension occur in SMOC, TMVB and SMS.

Due to its biological and ecological importance, the fact that several of these mountain systems are included in areas that have been recognized as Natural Protected Areas, National Parks and Terrestrial Priority Regions for Mexico, is highlighted (Arriaga et al. 2000) (FIG. 8).

Of the 25 species of pines associated with *Dendroctonus*, seven are preferred hosts according to the percentage of incidents they record: 1) *Pinus leiophylla* is the preferential species of: *D. approximatus, D. mexicanus, D. parallelocollis* and *D. valens,* 2) *P. durangensis* of *D. approximatus, D. brevicomis* and *D. valens,* 3) *P. engelmannii* of *D. brevicomis* and *D. rhizophagus,* 4) *P. hartwegii* of *D. adjunctus,* 5) *P. oocarpa* of *D. frontalis* (FIG. 9), 6) *P. jeffreyi* of *D. jeffreyi* and 7) *P. devoniana* of *D. vitei*. However, the pine species that interact with a greater diversity of these insects throughout their distribution are: *Pinus arizonica, P. durangensis, P. leiophylla* and *P. teocote* (FIG. 10), since up to eight *Dendroctonus* species have been found on them, among which are the four primary species that cause the most damage to coniferous forests in Mexico.

LIFE CYCLE AND BEHAVIOR

The pine debarking weevil, *Dendroctonus frontalis.*

Figure 1:
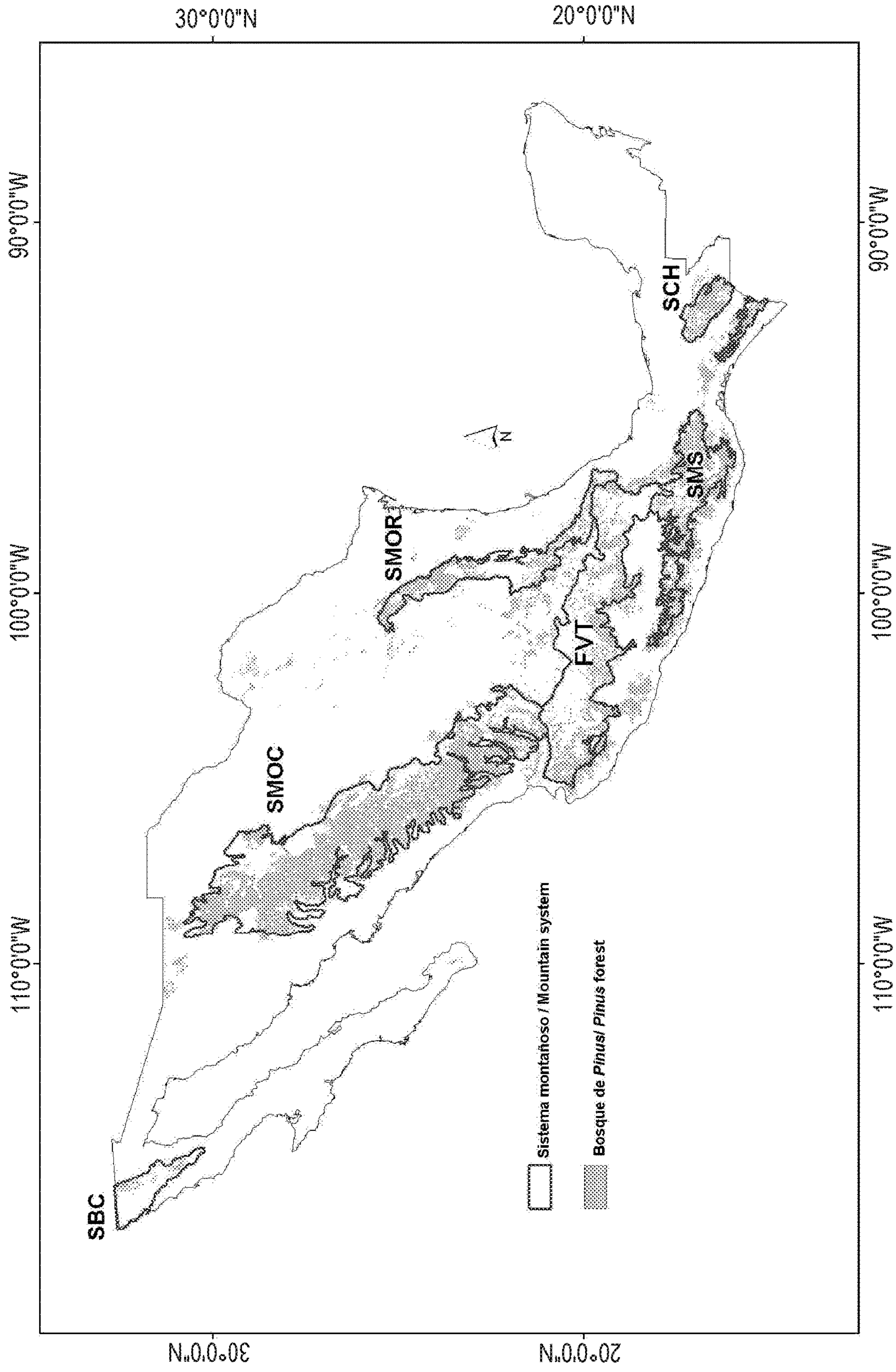
FIG. 1. Distribution of mountain systems in Mexico and the host pine species.
Figure 2:
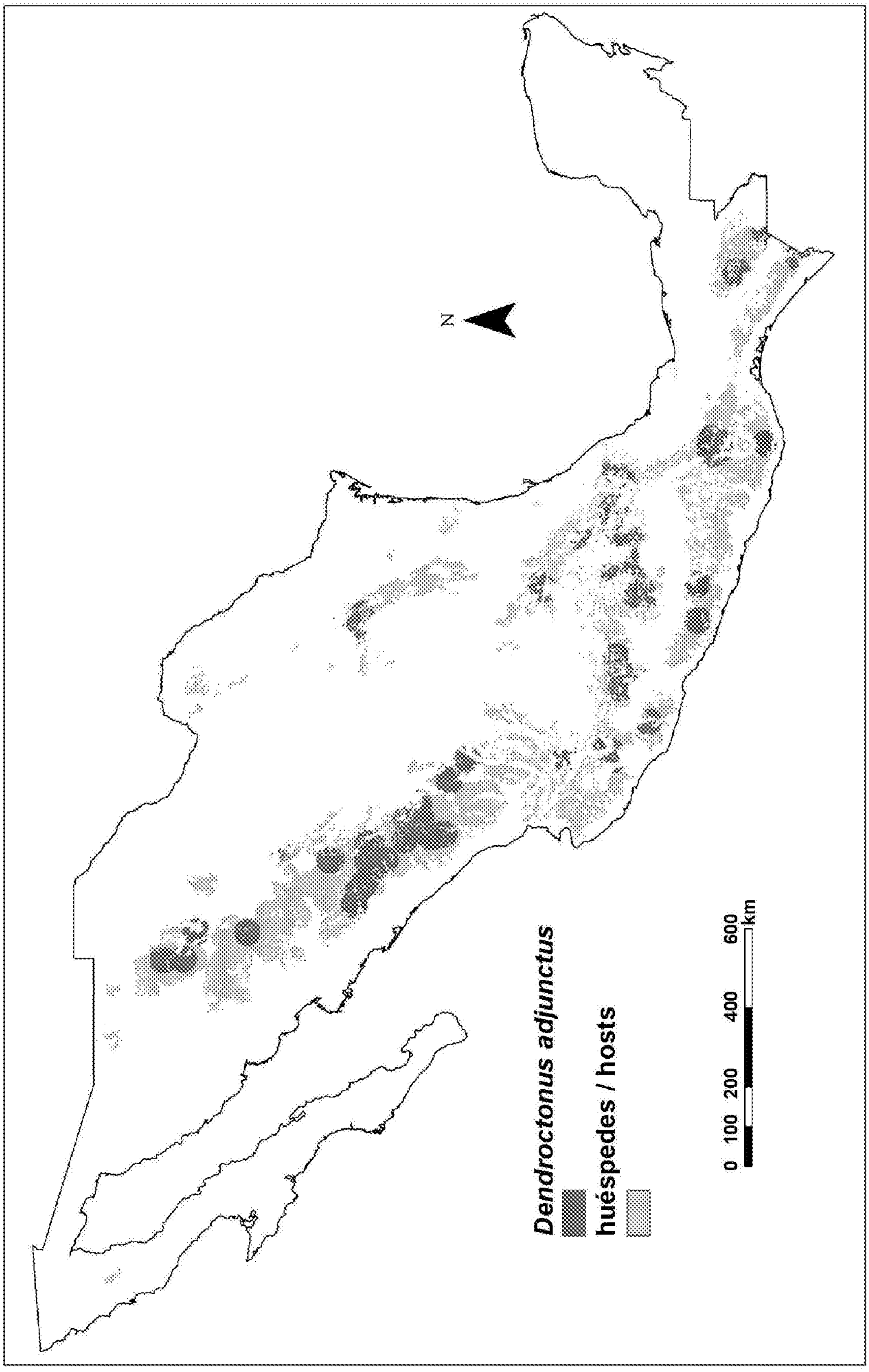
FIG. 2. Geographical distribution of *Dendroctonus mexicanus* and its host species in Mexico, based on collections of the last century.
Figure 3:
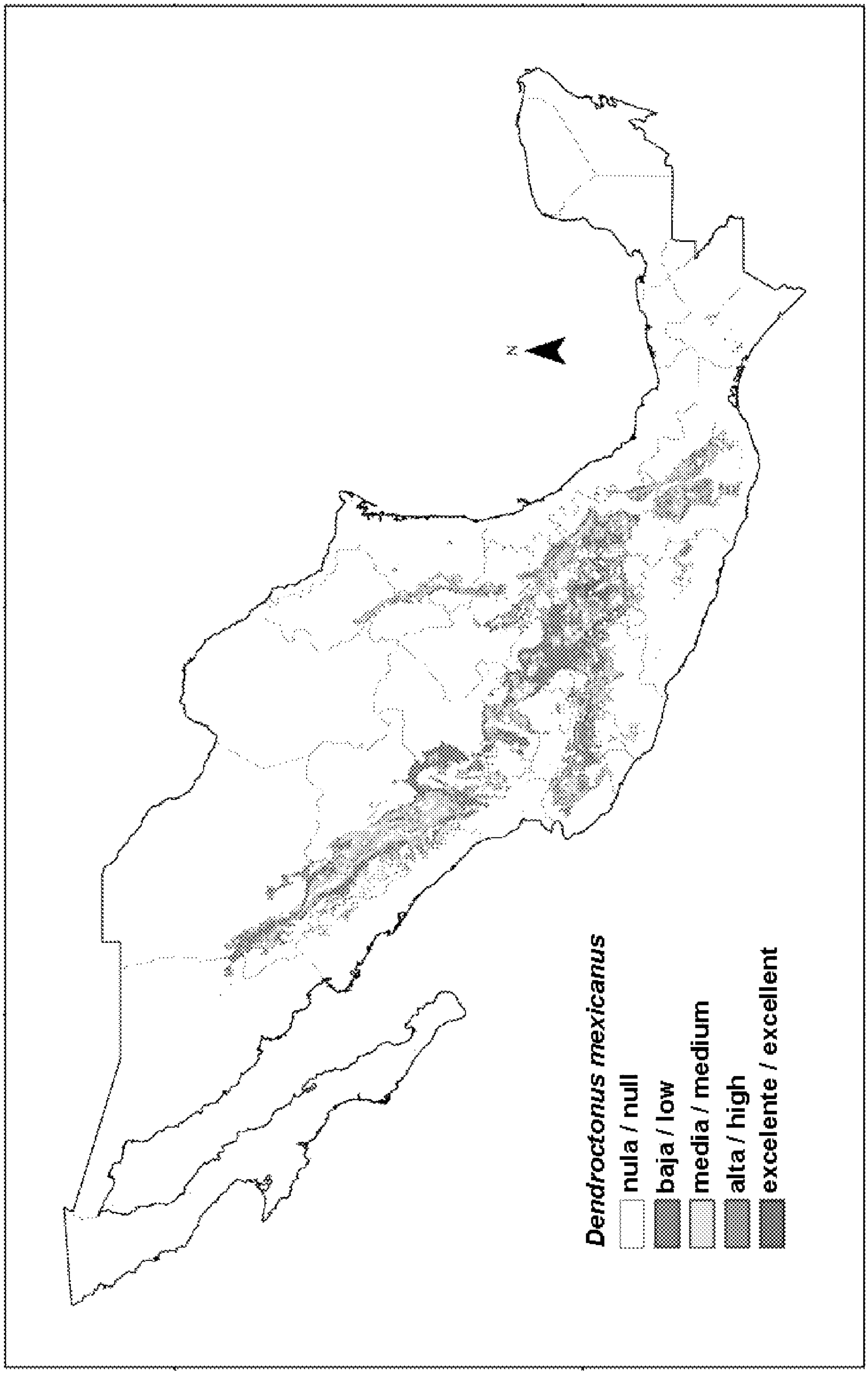
FIG. 3. Potential geographical distribution of *Dendroctonus mexicanus* in Mexico.
Figure 4:
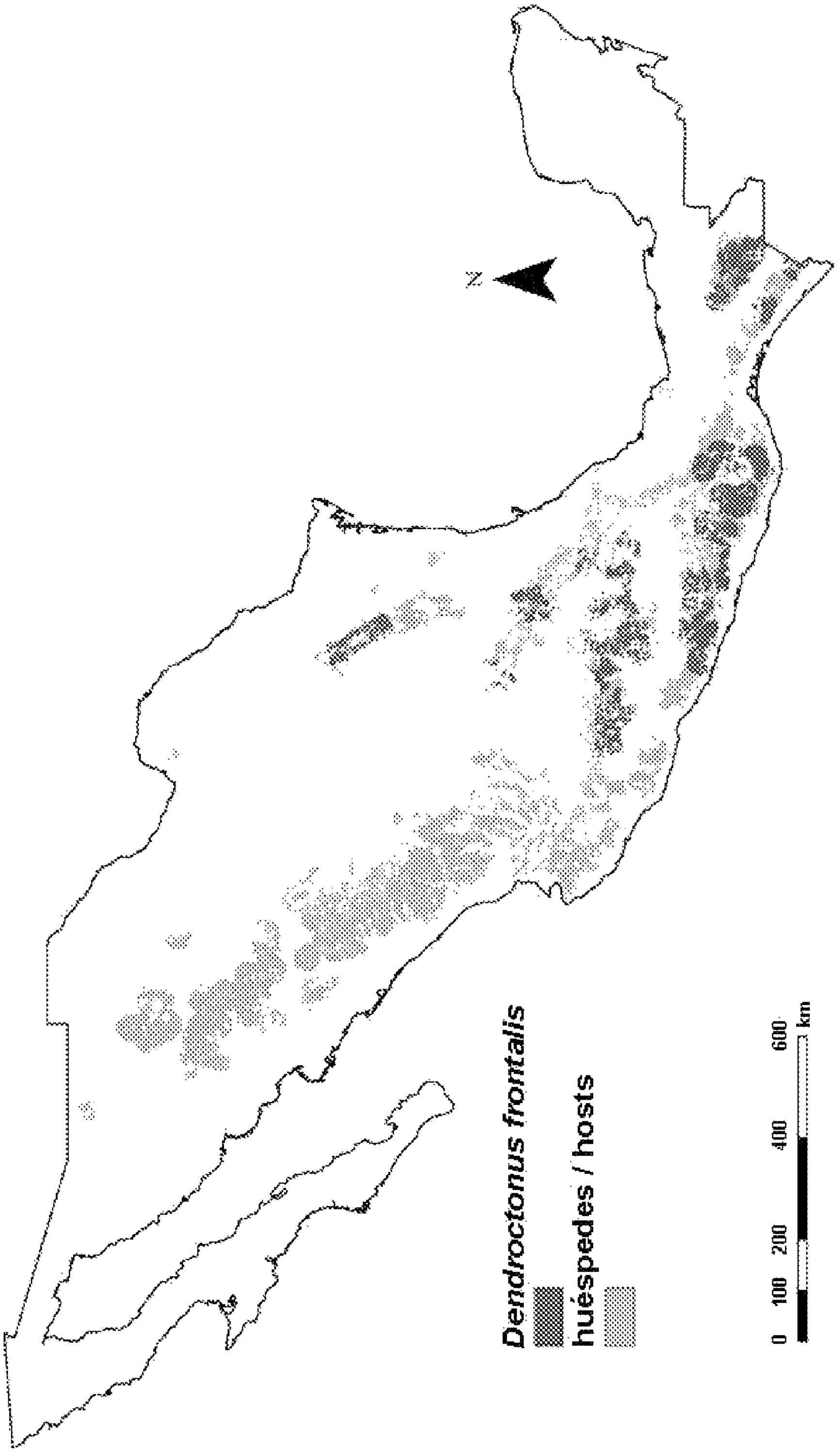
FIG. 4. Geographical distribution of *Dendroctonus frontalis* and its host species in Mexico, based on collections of the last century.
Figure 5:
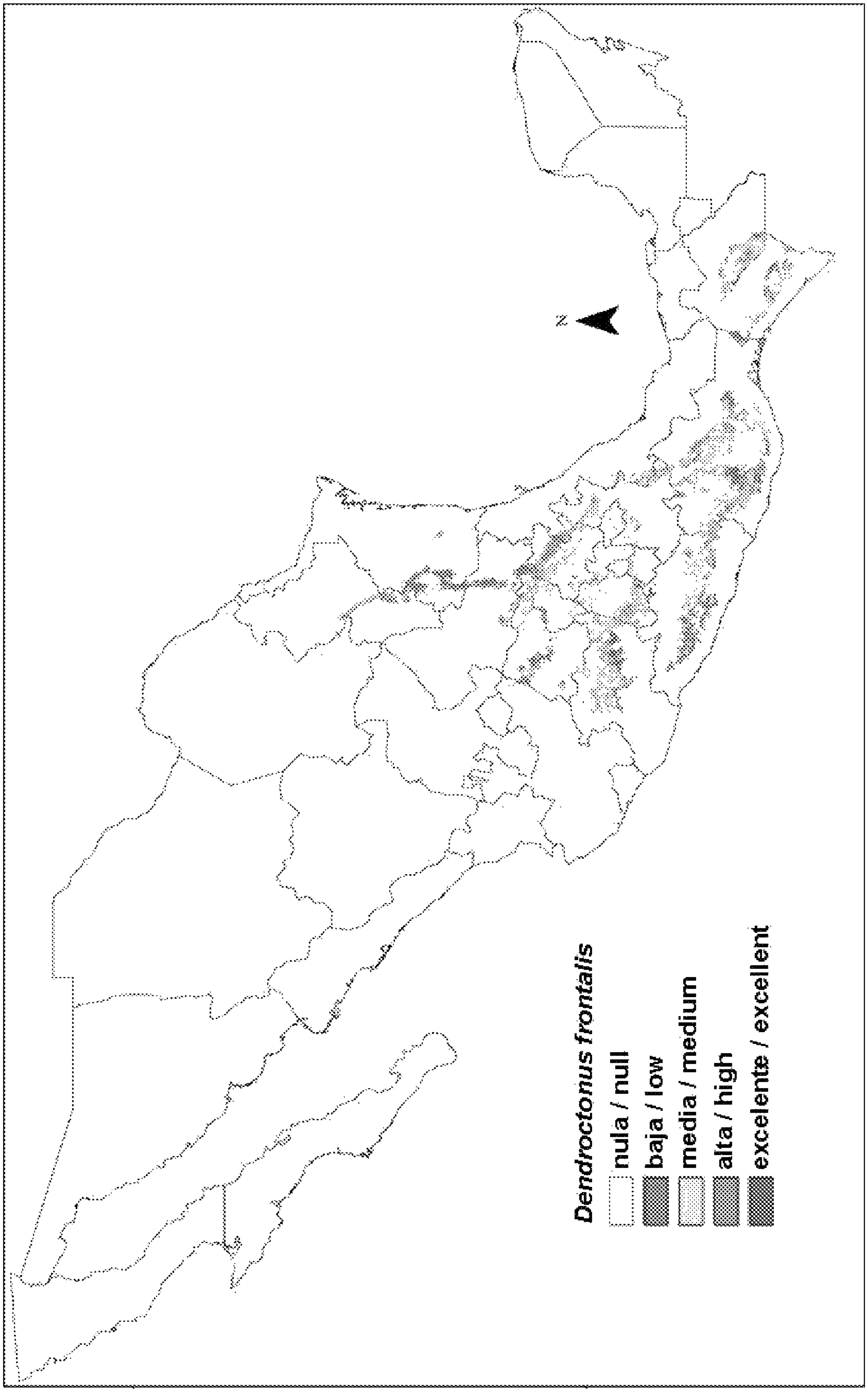
FIG. 5. Potential geographical distribution of *Dendroctonus frontalis* in Mexico.
Figure 6:
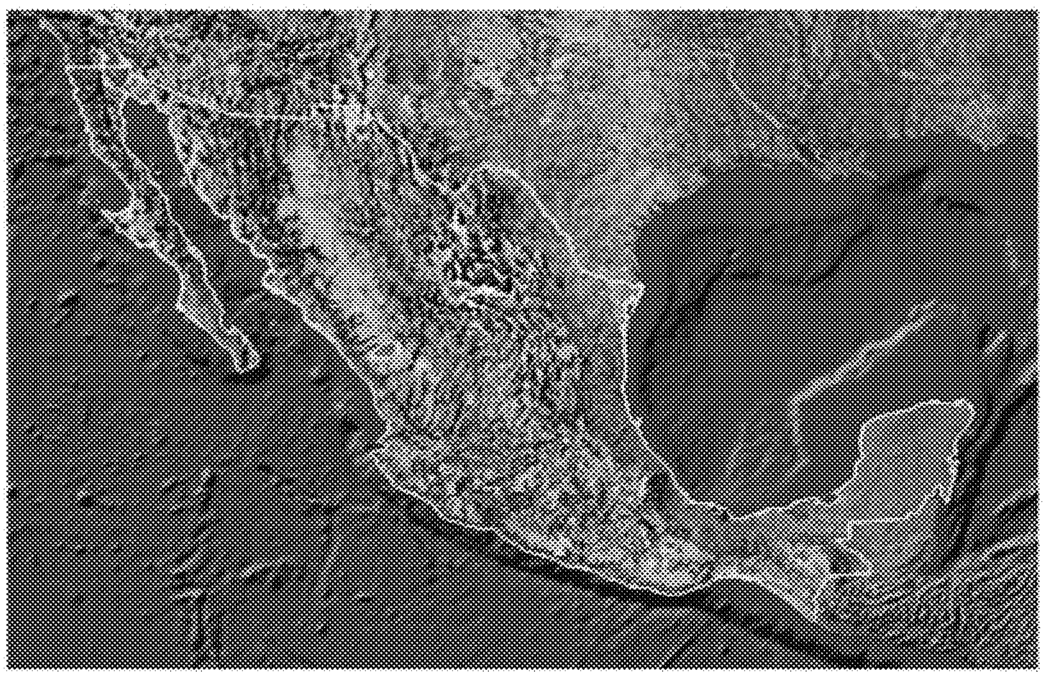
FIG. 6. Pressure by debarkers of the genus *Dendroctonus* on pine forests in Mexico. Low (light blue), medium (yellow), high (red).
Figure 7:
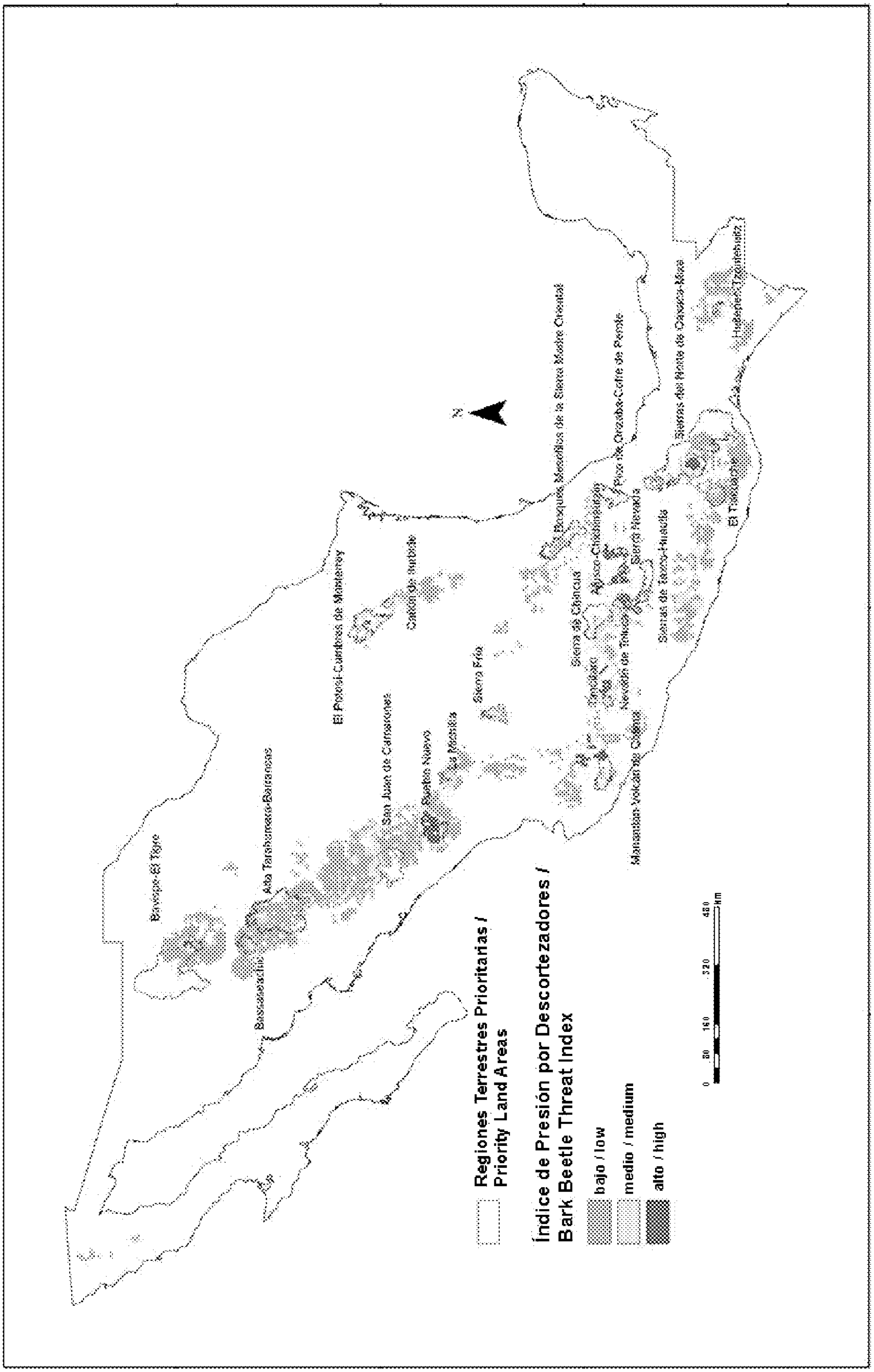
FIG. 7. Terrestrial Priority Regions vulnerable with medium and high values in the Debarker Threat Index.
Figure 8:
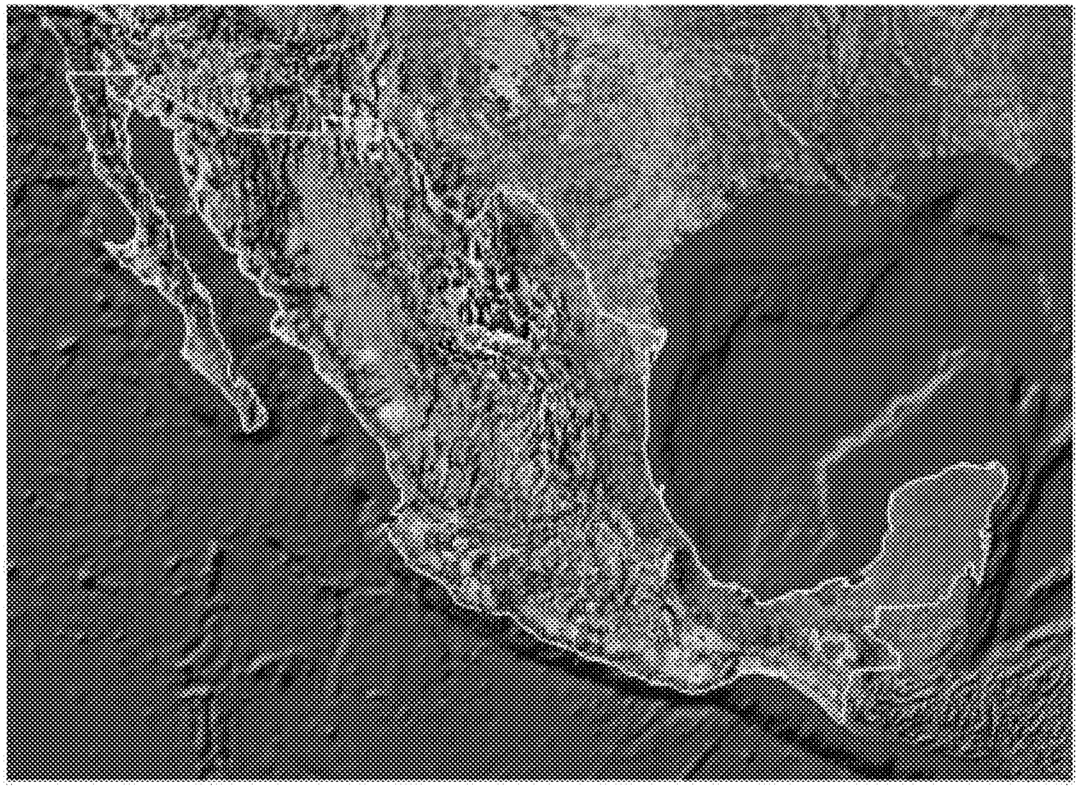
FIG. 8. Debarker Threat Index on *Pinus oocarpa* distribution. Low (light blue), medium (yellow) and high (red).

Females initiate attacks on susceptible pines and release a chemical attractant that attracts other weevils. Subsequently, a mass attack takes place, by weevils from the same or other infestations located nearby. The attacks affect, first, the middle part of the shaft and, later, the rest of the tree. Typically, there are between 30 and 35 attacks per bark square foot. Once the tree has been fully occupied by *D. frontalis* and other associated debarking weevils, the attacks change or move to other nearby pines, leading to the growth or expansion of the outbreak. This process of emergency and attack can continue and produce the mortality of healthy trees located in the periphery in large infestations.

After mating, each pair of weevils builds a tortuous gallery inside the bark. Next, the female deposits the eggs in individual hollows on each side of it. These galleries, which frequently join or intersect with each other, create a ring on the tree. Subsequently, the bluish fungus of the wood acts. This fungus, carried by attacking weevils and other associated mites, penetrates the wood in triangular sections, and plugs the tree's water conduction system. Once the eggs are deposited, most of the adults reemerge and attack other trees.

In a later phase the rupture of the eggs occurs, giving rise to young larvae that dig galleries and feed between the bark and the wood. The more mature larvae burrow into the bark. Pupation takes place in an oval chamber at the end of the previously excavated galleries. New adults emerge from each of these cells. These young adults drill individual exit holes through the cortex and can fly to other recently attacked trees or scatter to initiate new infestations.

The growth of the outbreak will depend on the emergence of adult weevils, the presence of recently attacked trees, and the proximity of other host material.

Under ideal conditions the development of weevils, from egg deposition to adult emergence, can take place over a period of 30 to 40 days. The number of weevils can be multiplied by ten in the same generation, and, in Central America, *D. frontalis* can attain up to 11 generations in a year. In this way, a dispersed population can increase to an epidemic level at a certain time of growth.

Description of Life Cycle Stages

The eggs of the debarking weevil are white, small, and difficult to see. Laying takes place in individual gaps (*D. frontalis* and *Ips* ssp.) or grouped on the walls of the galleries (*D. terebrans* and *D. valens*). The larvae are whitish, legless, and "C" shaped, with a bright reddish-brown head. As for their size, they vary depending on the species and the stage of development that they are in. In the resting phase (pupa) it is white, very soft and similar in size to the adult weevil. New adults are light brown or amber, adopting darker shades, reddish-brown or black, as they mature. These new adults are short-legged and robust and vary in size depending on the species concerned. The back of the body in *Dendroctonus* is rounded, while in *Ips* it is concave (outward) presenting between 4 and 6 spines on each side (4 for *I. avulsus,* 5 for *I. grandicollis* and 6 for *I. calligraphus*).

Symptoms of the Attack

Foliage discoloration: The clearest way to identify an attack is by observing the discoloration of the foliage. At first the needles fade adopting a yellowish color, then red and, finally, brown. This process takes between 1 and 4 months from the initial attack. The discoloration of the entire tree canopy is typical in attacks produced by *I. calligraphus, I. grandicollis, D. terebrans* and *D. Frontalis. I. avulsus*, on the other hand, occasionally affects the top of the crown. *D. frontalis* affects groups of trees, commonly called shoots or spots, varying from a few trees to hundreds of hectares. The treetops are generally green or yellowish in coloration at the extremes of the outbreak, where they are still active, and red, brown, or completely naked in older areas. The infestations caused by the genus *Ips*, as well as those produced by *D. terebrans* or *D. valens*, usually affect scattered individual trees or groups of trees of very small size, presenting mostly the same foliage coloration.

Other symptoms of the attack are:

Clumps (resin tubes): Clumps mark the weevil's entry points through the bark. Those produced by *Ips* ssp. and *D. frontalis*, mostly located in the cracks of the trunk and the largest branches, are usually the size of a coin of 10 cents or less. As for their coloration, those of *Ips* are red and those of *D. frontalis* are white. Resin tubes of *D. terebrans* and *D. valens*, usually the size of a 25-cent coin or greater, are concentrated in the base of the trunk and larger roots. Unlike other debarking weevils, *D. terebrans* or *D. valens* can sometimes last for several months on the same tree.

Sawdust: Under conditions of unusual dryness, affected trees may not be able to produce resin tubes during a *D. frontalis* or *Ips* attack. In these circumstances, the only visible sign of the attack may be the reddish sawdust present in the cracks of the bark, the spider webs or understory leaves.

Unlike the previous ones, *D. terebans* or *D. valens* give rise to yellow-whitish resin grains in the cracks of the bark and base of the tree. Later, a fine white sawdust, produced by ambrosia weevil, may appear at the base of the attacked trees.

Even though the foliage of the attacked trees may remain green, the symptoms mentioned indicate that they have been dominated by weevils and are dead or in a critical state.

Figure 9:
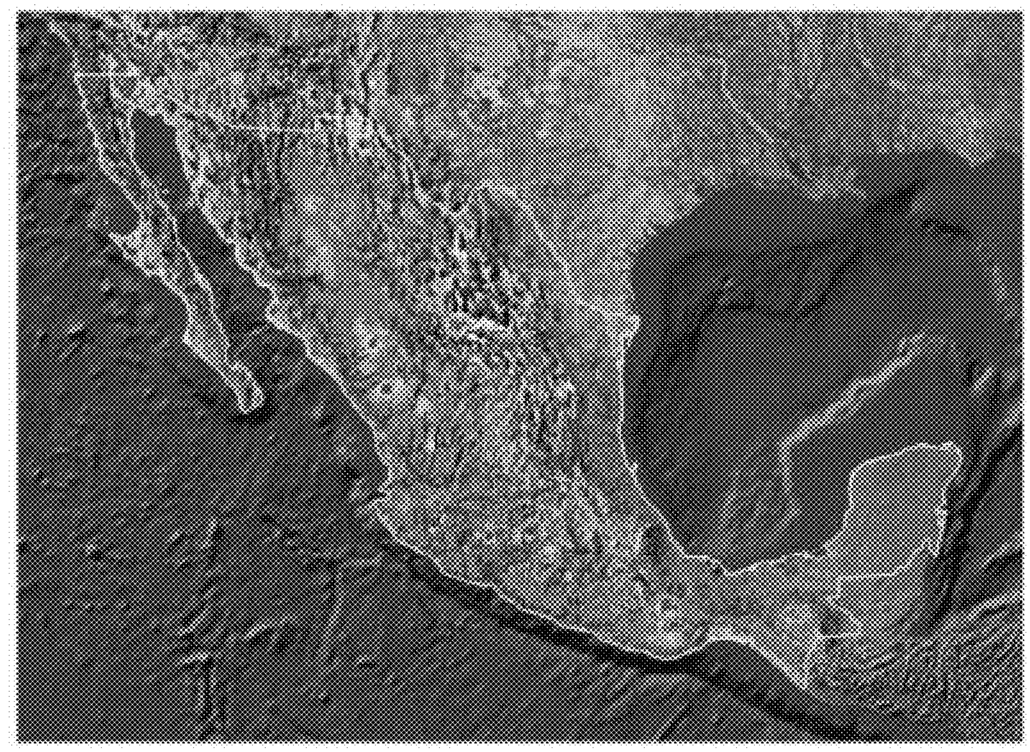
FIG. 9. Debarker Threat Index on *Pinus teocote* distribution. Low (light blue), medium (yellow) and high (red).
Figure 10:
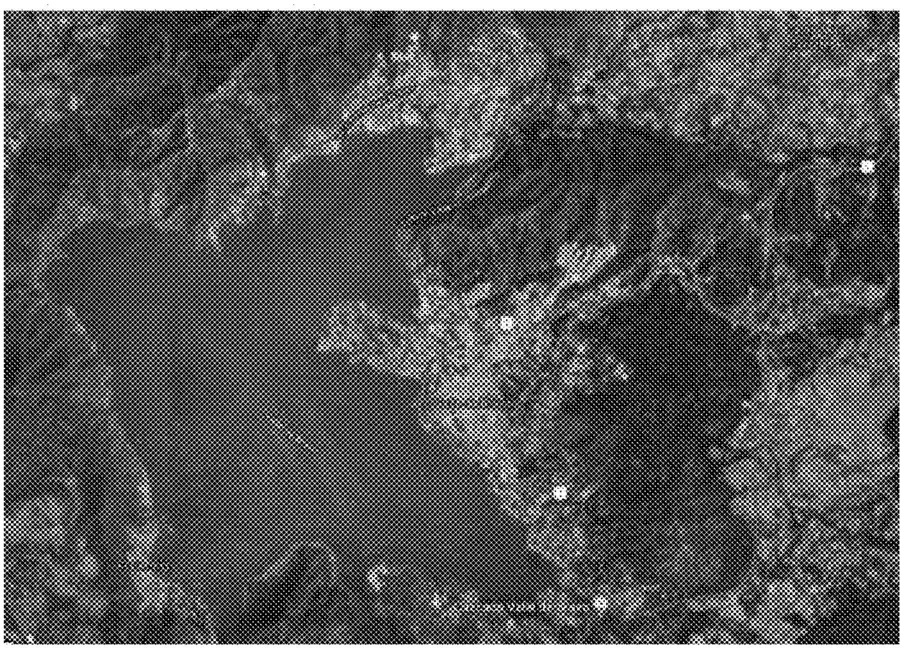
FIGS. 10A and 10B. Study area.
Figure 10:
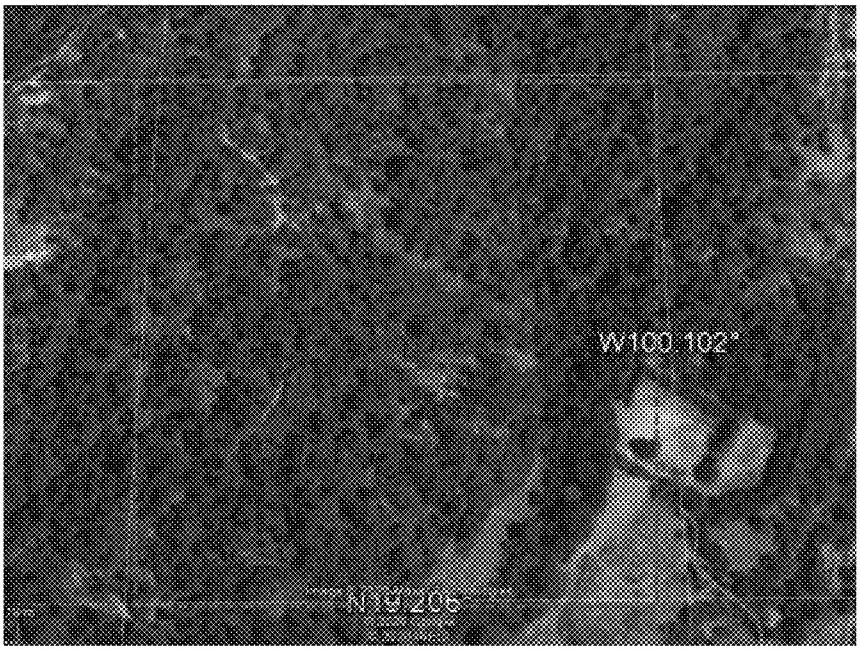

Galleries: The extraction of the bark of the infested pines, subjected to an attack for one or several weeks, allows identification, in a general way, of a series of gallery characteristics for each species of weevil. The *D. frontalis* galleries are curved or "S" shaped. These galleries are covered with sawdust and crisscross each other inside the bark and the surface of the wood. The galleries produced by weevils of the genus *Ips* have a central chamber from which between two and four galleries radiate, and that together give rise to structures in the form of "I", "Y" or "H" (FIG. 9). The galleries of *D. terebrans* and *D. valens* are elongated (up to 1 inch of width and 12 or more inches in length) in the direction of the fiber and are sometimes covered by resin.

Figure 11:
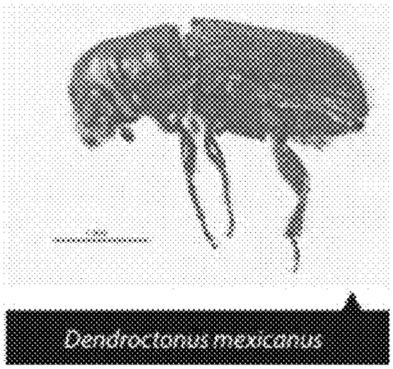
FIG. 11A. *Dendroctonus mexicanus.*
FIG. 11B. *Dendroctonus frontalis*
FIG. 11C. Label of insecticide used in residue control
Figure 11:
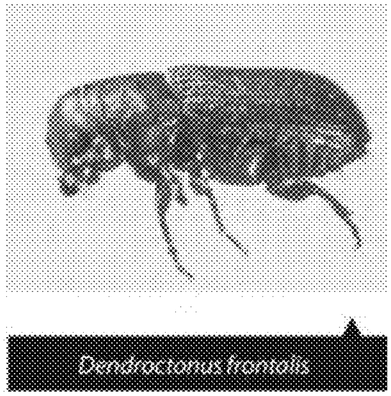
Figure 11:

Adult exit holes: Adult bark weevils exit the tree by digging through the bark. Exit holes are made by adults that re-emerge after mating and egg laying, as well as by the new generations of adults emerging after their development in or under the bark. The exit holes of the genus *Ips*, as well as those produced by the *D. Frontalis*, are similar in size to those produced by an airgun (FIG. 11), whereas those of *D. Terebrans* are larger (about ⅛ inch in diameter).

Study Area

It is located within the Valle de Bravo area (FIG. 1), between northern latitude parallels 19.206° and 19.209°; west longitude meridians 100.102° and 100.105°; with an average altitude of 2008 m.

It borders to the north with the municipalities of Ixtapan del Oro, Donato Guerra and Amanalco; to the east with the municipalities of Amanalco and Temascaltepec; to the south with the municipality of Temascaltepec; to the west with the municipalities of Zacazonapan, Otzoloapan, Santo Tomas and Ixtapan del Oro.

It belongs to the Province of the Trans-Mexican Volcanic Belt and Sierra Madre del Sur. It has a temperature range of 12-22° C. and precipitation of 1,000 to 1,500 mm.

It has a temperate subhumid climate with rains in summer, of higher humidity (78.57%), semi-warm subhumid with rains in summer, of medium humidity and semi-warm subhumid with rains in summer, of higher humidity.

The pine-oak forest is the predominant vegetation type in the Valle de Bravo basin; it is located at elevations above 1 800 m and reaches altitudes of up to 2 700 m, where the genus *Pinus* species is clearly dominant. Regarding its vertical structure, this type of vegetation has two to three layers: tree, shrub and herbaceous. The most important stratum is the arboreal, with average heights between 15 and 25 in. The presence (or absence) of a well-defined shrub stratum is related to the management that is being given to the forest at each site; in areas where wood is extracted, no reforestation practices are in effect, or in disturbed sites (open to cultivation and subsequently abandoned), the shrub stratum is poorly represented or non-existent and the treetops cover less than 60% of the surface. The dominant species in this type of vegetation belong to the genera *Pinus* and *Quercus*, and are usually accompanied by species of genera *Arbutus, Buddleia, Alnus* and *Cupressus.*

The debarker *Dendroctonus frontalis* (Coleoptera: Scolytidae) is one of the most harmful pests. The losses caused by it can be reduced through the application of one or more control techniques. These include direct control methods to treat individual trees and infestations (outbreaks), and indirect methods including proper management of potentially susceptible stands. These lines describe the current sanitation measures recommended for direct control of *Dendroctonus frontalis.*

These measures minimize wood losses during an epidemic period and can also be applied against some other species of the genus, such as the "Mexican pine barker", *Dendroctonus mexicanus* and the "debarker of the heights", *Dendroctonus adjunctus.*

Sanitation Methods in Force

Infestations of *Dendroctonus frontalis* and those produced by other debarkers must be located before being treated. Typically, most outbreaks or sites can be detected through aerial surveys (Billings, Flores, and Cameron, 1996). Airborne observers use both foliage color (red and yellowish) as well as the number of dying trees to assign a priority of ground inspection of each outbreak or infestation site (see FIG. 1). Ground brigades inspect outbreaks to identify the cause of mortality and determine the need for treatment (Billings, Pase, & Flores, 1990).

In addition, some of these methods can be used to control outbreaks of debarkers which attack standing trees mainly during periods of stress, such as drought.

In case they are caused by *Dendroctonus frontalis*, outbreaks with high priority are treated first, rather than those of medium or low priority, as they have greater potential to cause additional mortality of trees. Control decisions depend not only on the priority of the outbreak, but also on the availability of brigades and equipment, size and number of trees or volume of wood in the outbreak as well as market conditions for timber killed by barkers. The criteria presented in Table 1 and 2 should be considered in assigning control priorities.

High-priority outbreaks—are those with the highest number of trees infested by *Dendroctonus frontalis*—should be the first to be marked for treatment. The cutting for recovery (cut and harvest) is the preferred method.

Due to the dynamic nature of *Dendroctonus frontalis* infestations, the time period between marking and cutting should be as short as possible. As time is allowed to pass, there is a greater possibility of additional trees being attacked. If this happens, the outbreak will have to be re-marked. No more than four weeks should pass between marking and treatment.

Medium priority outbreaks—As a general rule, medium priority outbreaks should not be flagged for control until all high-priority outbreaks have been treated. However, when a medium-priority outbreak is close to a high-priority infestation, it may be desirable to treat both areas at the same time.

Low-priority outbreaks—These outbreaks may not require any treatment. Studies have shown that, especially during the summer (June-August), most end without the need to take any action. Low-priority outbreaks that continue to expand should be detected during the next aerial inspection and assigned a new priority for ground inspection.

TABLE 1

Symptoms associated with the different phases of tree infestation by *Dendroctonus frontalis.*

| Symptom | Recent attack (phase 1) | Offspring in development (phase 2) | Abandoned tree (phase 3) |
|---|---|---|---|
| Folliage | Green | Green treetops with larvae; change to yellowish before pupa emerges | Red pine needles, falling from the crown |
| Resin clumps | Soft; white; slightly pink | White, hardened | Hard, yellow, they desintegrate easily |
| Cleridae | Adults on bark | Pink or red larvae, aprox 1.5 cm in *D. Frontalis* galleries | Purple larvae and pupa; can be seen on cameras on external bark |
| Bark | Firm, difficult to remove | Loose, easily detached | Very loose, easy to remove |

TABLE 1-continued

Symptoms associated with the different phases of tree infestation by *Dendroctonus frontalis*.

| Symptom | Recent attack (phase 1) | Offspring in development (phase 2) | Abandoned tree (phase 3) |
|---|---|---|---|
| Wood color | White, except close to galleries | Light brown with blue or black sections | Dark brown to black |
| Exit holes | None | Few associated with the re-emergence of attacking adults | Numerous |
| Ambrosia beetle sawdust | None | White, located in the base of the tree | Abundant in the base of the tree |

TABLE 2

*Dendroctonus frontalis* outbreak growth guide and control priorities.

| Outbreak growth key | Outbreak classification | Risk score |
|---|---|---|
| A. Trees in phase 1 | absence | 0 |
| | presence | 30 |
| B. Trees in phase 1 and 2 | 1-10 | 0 |
| | 11-20 | 10 |
| | 21-50 | 20 |
| | more than 50 | 40 |
| C. Basal area (ft2/acre) (or stand density) in active front | less than 80 (low density) | 0 |
| | 80-120 (medium density) | 10 |
| | more than 120 (high density) | 20 |
| D. Type of stand according to DBH (in inches) | pulp (9 inches or less) | 0 |
| | sawmill (more than 9 inches) | 10 |
| | Total . . . | |

If the total score (A + B + C + D) is 70-100, the priority is high; 40-60 is medium, and 0-30 is low priority.

Suppression—Suppression must be an effort carried out throughout the year. The greatest efforts should be carried out from late spring through autumn (late May to late November), to actively control expanding infestations. Treatments in winter (December-February) and early spring (March) are also important, as they reduce the growth potential of the outbreak and/or the development of new shoots later in the spring (March-May) or in the summer (June-August).

The correct identification of the causal agent and the owner's management objectives will have a great influence on the selection of one or more control methods. The sanitation cuts currently recommended for direct control of *Dendroctonus frontalis* infestations include: 1) cut and harvest, 2) cut and leave, 3) chemical control and 4) stack and burn. The same methods serve to control some—but not all—of the other species of debarkers. To control infestations of debarkers the method of cutting and debarking, without burning the bark can be applied. This latter does not work for *Dendroctonus*, because its offspring are able to complete their development within the loose cortex.

The most effective control methods to control infestations of important debarkers in Mexico, Central America and the Caribbean countries are indicated in Table 3.

TABLE 3

The most common recommended methods for direct control of various species of pine debarkers in Mexico, Central America, and the Caribbean.

| Debarker species | Recommended methods[1] | Not recommended methods |
|---|---|---|
| *Dendroctonus frontalis*[2] | Cut and harvest<br>Cut and leave<br>Stack and burn<br>Chemical control | Cut and debark (without burning bark) |
| *Dendroctonus mexicanus*[2] | Cut and harvest<br>Cut and leave<br>Stack and burn<br>Chemical control | Cut and debark (without burning bark) |
| *Dendroctonus adjunctus*[2] | Cut and harvest<br>Stack and burn<br>Chemical control | Cut and debark (without burning bark)<br>Cut and leave |
| *Ips* spp. | Cut and harvest<br>Stack and burn<br>Cut and leave<br>Chemical control | Cut and leave |

[1]Listed in order of preference.
[2]To date, this debarker has not been found in the Caribbean Islands.

The following points explain how to apply these techniques.

Cut and Harvest (=Demolition and Harvesting)—To control debarker infestations, managers and owners generally prefer the method of cutting and making use over other control options. Only this tactic uses infested trees and removes them from the forest, allowing some economic return to the owner. However, the use of isolated outbreaks is not always practical because the place may be inaccessible, the volume of wood may be insufficient, the market poor for pulpwood or sawdust, or other ecological limitations. In addition, recovery cuttings are generally slower to organize than the implementation of alternative tactics.

For recovery to be effective, the infested material must be removed in a timely manner. An adequate strip of uninfested trees around the expanding boundaries of the outbreak must be cut. Doing this ensures the removal of infested pine trees that may not have been registered, or that were infested after the outbreaks were inspected and flagged.

The following procedures should be applied to control *Dendroctonus* outbreaks by recovery cut:

1.—Identify the front (s) of expansion of the outbreak. The front contains those trees that have recently been attacked. They may have green or yellowish foliage or, fresh resin lumps, sawdust in the bark crack or in shrubby vegetation, firm bark, and adult beetles on the bark.

2.—Mark all the trees infested by *Dendroctonus* or the boundary around them if they are very numerous.

3.—If recently infested trees are observed (phase 1), a preventive strip of non-infested green trees should be marked in a horseshoe-shape around the front(s). The strip must include those newly infested trees. As a general rule, the width of the strip should not exceed the average height of the trees in the outbreak. When an outbreak has 10 or fewer infested trees, none of them newly attacked, usually no treatment is required.

4.—The recovery cutting of the infested trees and preventive strip should be started as soon as possible after ground inspection and marking of the outbreak. Abandoned trees (phase 3; see Table 2) can be left standing as their removal would not contribute to control of the insect. However, these can be recovered if they have not been deteriorated and if the volume they contribute is required to make the treatment cost-effective. The following priorities should be followed, in order of importance:

Trees in the preventive strip

Trees with recent attacks

Remaining trees with offspring

Abandoned trees

5.—Infested trees should not be stacked next to green trees, as emerging adults can infest neighboring trees.

6.—You can take advantage of cut trees by means of a portable saw or transport the logs by truck to a sawmill for use.

7.—During the next aerial detection flight, it should be checked if no other trees appear infested in the treated areas. New outbreaks should be treated as needed.

Cut and Leave (=Demolition and Abandonment)—The method of cut and leave was initially recommended by the Forestal Service of Texas to control small outbreaks that could not be recovered. This technique consists of cutting infested trees and a preventive strip of non-infested trees, leaving them in the forest. Treatment disrupts the growth of the outbreak and causes adult beetles to disperse into the forest without causing major damage. Outbreaks should be treated this way only if they contain newly infested trees (phase 1). This method has been used with great success in the United States and Honduras to control outbreaks of *Dendroctonus frontalis*.

The method of cutting and leaving is practical, relatively cheap and requires minimal labor, equipment, and training The procedure can be applied immediately after detection. The biggest disadvantage is that a strip of uninfested green trees must be cut off around the active front of each outbreak to ensure that newly infested trees, which would favor expansion of the outbreak, are included in the treatment. If the recovery cut is deemed profitable at a later date, the cut trees could be recovered.

To control *Dendroctonus frontalis* or *D. mexicanus* infestations with the method of cutting and leaving, the following procedures should be followed:

1.—Select outbreaks with 10 to 100 infested trees. Some of the attacked trees must show a recent infestation (phase 1). High-priority outbreaks—those with a high proportion of newly infested trees—should be treated first. Sites with more than 100 infested trees can be treated with this method if they are going to be recovered later or there is no other control method available.

2.—Mark and cut the infested trees towards the center of the outbreak.

3.—Mark and cut a preventive strip of non-infested trees (phases 1 and 2) in a horseshoe-shape around the infested trees.

Knock down trees toward the center of the outbreak. In small outbreaks, the strip can enclose the outbreak. However, the strip should not be wider than the average height of trees on the site (an exception would be in the case of very large infestations).

4.—The dead trees from which all the offspring has emerged (phase 3), do not need to be cut. Leaving these trees allows the natural enemies of the debarker to complete their development and emerge. These trees also serve as habitat to some species of woodpeckers.

5.—The treated outbreaks with the method of cutting and leaving should be checked on during the next flight to detect breaks. A rupture refers to the infestation of trees around a presumably controlled outbreak. Each rupture must be treated according to its needs.

Now, according to the Official Mexican Norm NOM-019-SEMARNAT-2017, which establishes the technical guidelines for the prevention, combat, and control of bark insects, in paragraph 5.8 numeral 9 it is stated that to treat *Dendroctonus adjunctus, D. mexicanus, D. frontalis, D. mesoamericanus, D. brevicomis, D. pseudotsugae, D. jeffreyi, D. valens Ips lecontei, I. confusus Phloeosinus baumanni, Hylesinus aztecus, H. mexicanus Pseudohylesinus Pseudopityophthorus*, the procedure is as follows: Demolition, cutting, debarking and application of chemical.

Treatments:

Demolition, cutting, debarking and application of chemical. It should be done according to the following:

a. Demolition b. Sectioning or cutting of shafts c. Debarking of logs and branches, the latter, with evidence of the presence of bark insects.

d. Application of chemical

The bark, logs and branches must be sprayed with an insecticide registered with the competent authority. The application of the insecticide should be carried out immediately after the demolition of the tree. The logs must be rotated to cover the entire surface.

Stump sprinkling will only be necessary when the presence of bark insect is observed.

Deltamethrin—The use of products whose principle is Deltramethine in its different brands, formulations, and concentrations for the control of bark insects in conifers, in a dose of 12.5 grain of active ingredient per every 100 liters of water.

Bifenthrin: The use of products whose active ingredient is Bifenthrin with emulsifiable concentrated presentation type in its different brands, which have current sanitary registration before COFEPRIS with a final dose of 20 grams of active ingredient per 100 liters of water for control of bark insects in conifers.

e. Residue control; applying another bath of insecticide, in the indicated concentration. The debarked logs can be extracted at any time.

Prevention—New and innovative bark insect management plans have been developed with the use of semiochemicals, which are now commercially available to manipulate and monitor debarker populations. The use of baits and traps with semiochemicals has allowed technicians to contain small outbreaks of infestations and, in this way, avoid spreading to susceptible stands, keeping bark populations at low levels (Safranyik and Hall, 1990 and Hayes and Strom, 1994).

When traps are widely dispersed, it is recommended to set a minimum of three traps, spaced at least 50 meters apart, at each trapping site. This will help minimize the potential for poor catches due to poor selection of the site and average catches can be more accurate. The deployment of the traps must be carried out before the flight of the first adults to emerge; i.e., approximately 2 weeks before the flight. The time of the insect's flight can be brought forward, particularly when winter and spring are hot, so care should be taken.

Funnels act to widely disperse semiochemicals through the wind. Beetles, when flying, collide with one of the funnels or land on an upper edge of a funnel, in both cases, the beetles protect their most vulnerable organ, their wings, closing them under their elytra. Once closed, beetles cannot remain airborne and usually enter the collection bottle. Confusion prevents flight to the top or outside and the beetles are oriented towards the white walls of the collection bottle (Phero Tech, 2002).

According to the Official Mexican Norm NOM-019-SEMARNAT-2017 technical guidelines for debarker insect prevention is as follows:

4.1 Those who have forest exploitation authorization, which include Conifer species and genus *Quercus*, Fraxinus and Ulmus; or where a sanitation notification exists for debarkers, issued by SEMARNAT, based on Article 148 of the Ordinance, the owners, in coordination with their forestry technicians, must carry out monitoring in order to determine areas of risk and spatial distribution of debarkers, selecting any of the methods described in numerals 4.2 Ground monitoring or 4.3 Monitoring with traps, of this Norm.

4.2 Ground monitoring 4.2.1 To carry out ground monitoring, one or more routes must be established, considering:

a) Risk areas such as: affected by drought, forest fires, areas under resin use, lightning strikes and areas with a history of bark debarkers.

b) Behavior of rainfall and temperature of the last five years, supported by graphs obtained from data from official sources.

c) Information from the drought monitor for Mexico and vegetation anomalies. www.conafor.gob.mx/web/temas-forestales/sanidad-forestal 4.2.2 The evaluation of the routes must be carried out monthly, during the flight seasons of the identified species.

4.2.3 The information of the routes must be recorded in a log based on Annex 1 format and kept for a minimum period of 5 years.

4.2.4 Based on results of the terrestrial monitoring a risk polygon must be developed and updated based on the monthly routes referred to in the numeral 4.2.2., identifying susceptible areas to being affected by debarkers.

4.2.5 Once the risk areas have been identified, it is recommended to carry out other preventive actions such as: silvicultural practices and use of semiochemicals, among others.

4.2.6 If active outbreaks are detected as a result of terrestrial monitoring, one must proceed in accordance with the provisions of paragraph 5 of this Norm.

4.3 Monitoring with traps 4.3.1 Site selection

Select a stand preferably with trees that have been previously infested, that do not present active outbreaks, that have suffered a fire or over-resinated areas.

4.3.2 Traps and their placement 4.3.2.1 The traps to be used must be those that have been designed for the trapping of bark insects and whose effectiveness is backed up by scientific and technical support. In the case of multi-funnel traps, these should be 8 or 12 funnels.

4.3.2.2 The setting of traps must be carried out during the flight season of the target bark species.

4.3.2.3 The attractant of each trap must be changed, every 45 to 60 days (depending on the expiration of the product), during the flight season.

4.3.2.4 In the case of sloping terrain, traps must be placed with an altitudinal differential of 100 in between them.

4.3.2.5 The number of traps to be placed must be in determined depending on the size of the affected property, and the location of the outbreak within it, with a minimum distance of 100 to 150 in between them.

4.3.2.6 Place traps in dead trees, broadleaf species, posts or tend ropes from one tree to another and hang them between them. They should not be placed on branches of live coniferous and should preferably be located on the banks of the stand.

4.3.2.7 The placement of the trap must be at a height of 1.0 to 1.7 in above ground level, measured from the collecting vessel.

4.3.2.8 The trap must be free of vegetation or infrastructure; likewise, during the monitoring season, it must be ensured that it is not obstructed with cobwebs, branches, leaves, or any other object that prevents its proper functioning.

4.3.2.9 The collecting cups of the traps must contain a plastic tablet impregnated with a low toxicity insecticide or some substance that ensures the permanence or death of insects.

In the case of PNA (Protected Natural Areas), the technical manager of the property, must ensure that the handling of insecticides or any other substance, does not contravene the provisions of the Management Program of the corresponding PNA.

4.3.3 Period of monitoring with traps and logging of data.

4.3.3.1 Monitoring should be annual, preferably at the same sites as the previous year and using the same number of traps and type of attractant.

4.3.3.2 Data on debarkers collected in traps, must be recorded in the log fortnightly, using Annex 2 format.

4.3.3.3 Collected insects must be preserved for a period of two years, in plastic or glass containers, in a solution of 70% alcohol and 30% water for their subsequent identification.

4.3.3.4 Once the species of debarker has been identified and considering the imminent damage, as well as an increase in the number of collected debarkers based on the previous flight period, it is concluded that there is an infestation and therefore, one must proceed in accordance with the provisions of paragraph 5 of this Norm.

Differences between the Existing and the Proposed

The difference between semiochemicals and their components, used in traps for monitoring and control, in cases of low infestation of *Dendroctonus* family on various varieties of pines with the procedure and product to be registered, is that the first case the *Dendroctonus* is attracted to the traps directly without this guaranteeing that the nearby tree will not be infected (field studies have shown that only the traps capture about 40% of the *Dendroctonus*, leaving 60% in their daily activity). Additionally, the replacement of traps every 45 or 60 days is omitted.

On the other hand, with the procedure and product to be registered, all the trees that have been treated according to the procedure will repel the presence of *Dendroctonus* avoiding the imminent infection and felling of the tree.

Finally, and very important to note is that the cost of the prevention means and or sanitation currently in use is much higher than the procedure and product to be registered.

DETAILED DESCRIPTION OF THE INVENTION

Material and Method

This work was carried out in *Pinus teocote* forest and *Pinus oocarpa* in the area of Valle de Bravo, State of Mexico.

Field trips were conducted to detect *Dendroctonus* during the month of March 2019 (spring). However, it is worth mentioning that in previous years there was *Dendroctonus* presence in that area, with sanitation according to the Official Mexican Norm NOM-019-SEMARNAT-2017 performed.

First, the identification and selection of the study areas was carried out, for which prior monitoring and direct sampling were carried out in the field to detect the presence of active focal points of *Dendroctonus mexicanus* and *Dendroctonus frontalis*.

Areas affected by *Dendroctonus* were identified, through direct observation, as well as the direction of infestation, in order to stop the advance.

The mixture of Levonorgestrel-ethinylestradiol was applied twice to a total of 1,000 infested trees and to healthy trees in three different doses (Table 4).

TABLE 4

| | Applied doses | | |
|---|---|---|---|
| Compound | Dose 1 | Dose 2 | Dose 3 |
| Levonorgestrel | 0.15 mg | 0.3 mg | 0.45 mg |
| Ethynilestradiol | 0.03 mg | 0.06 mg | 0.09 mg |

The first application was to contain the pest and the second dose application was for reinforcement.

Figure 12:
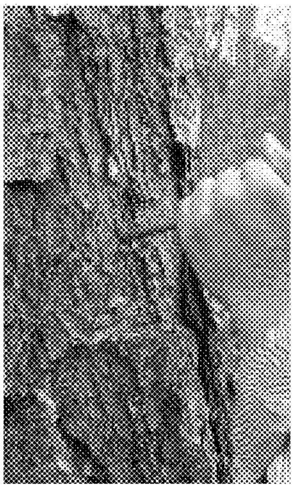
FIGS. 12A-12C. Borings.
Figure 12:
Figure 12:
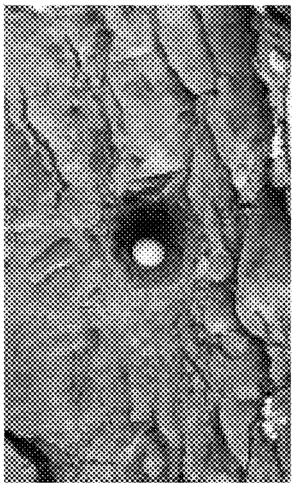

To apply the mixture a hole of 2 to 2.5 cm depth for trees with a diameter less than 20 cm, and a hole of 4 to 5 cm for trees with a diameter greater than 20 cm was made. The mixture was introduced as a tablet inside the hole and covered with damp soil from the base of the tree (FIG. 12).

The doses were applied to trees with some sign of infection, as well as to trees close to those infected; in this case it was done in a range of 60 in and in other cases it was done on trees close to the pest without having an exact measurement.

Figure 14:
FIGS. 14A-14F. *Dendroctonus* detection by way of the folliage.
Figure 14:
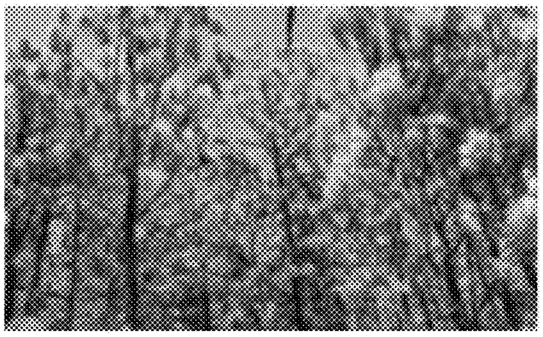
Figure 14:
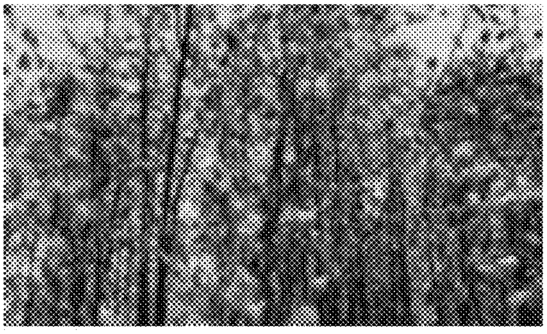
Figure 14:
Figure 14:
Figure 14:
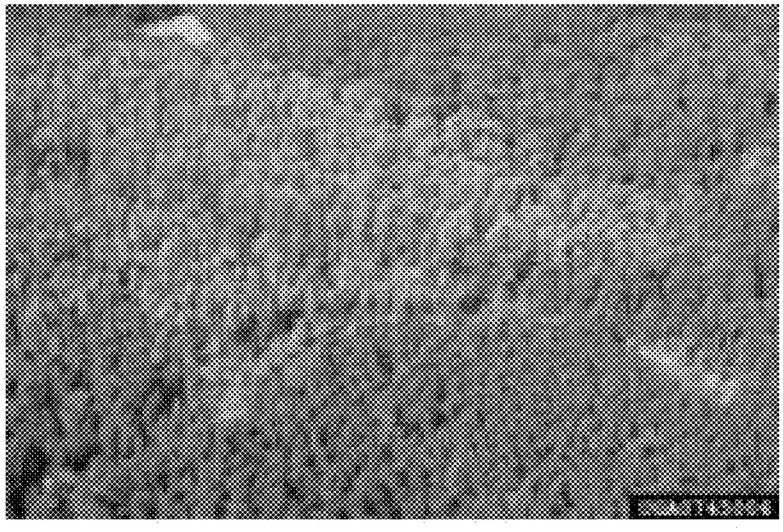
Figure 15:
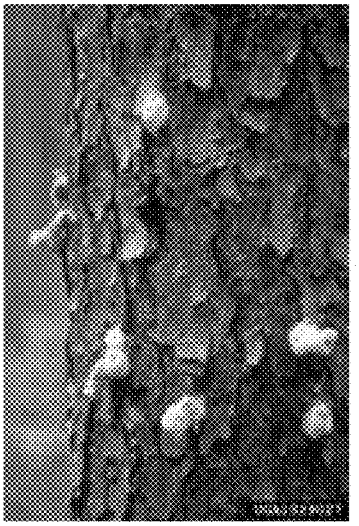
FIGS. 15A-15C. *Dendroctonus* detection by way of the tree trunk.
Figure 15:
Figure 15:

The presence of *Dendroctonus* in trees was determined by trunk resination and foliage discoloration (FIG. 14, 15).

The behavior of the tree and its surroundings was monitored. After two weather stations (5 to 6 months) the procedure was repeated in the area of application.

Figure 13:
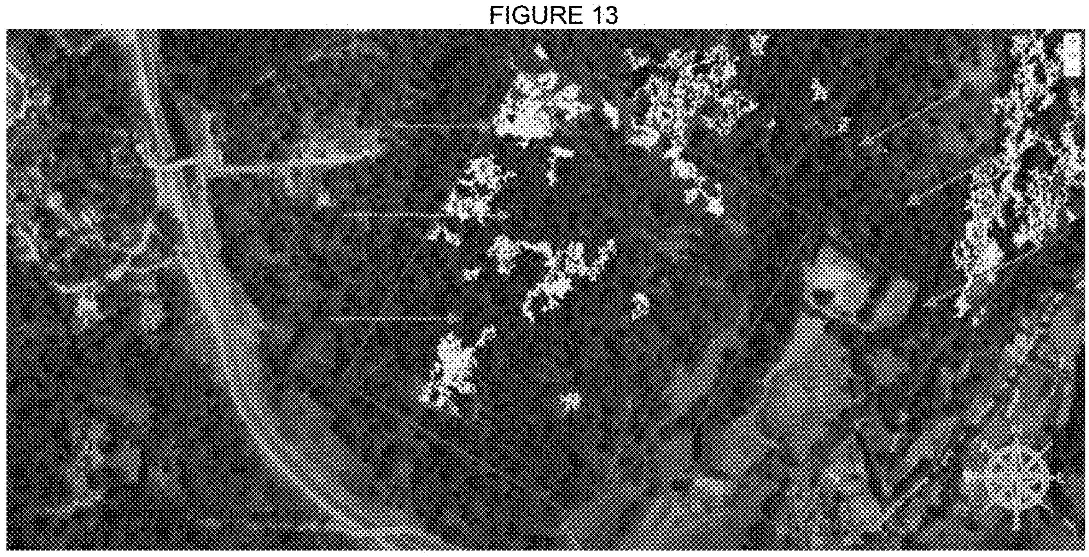
FIG. 13. Study area marked in red, area of infestation marked in blue, and infected area marked in yellow.

Work was carried out in an area of 10 ha in which it was determined that the infestation came from two directions: northeast-southwest and west-east. It was determined that the area affected by *Dendroctonus* covered an area of 23,000 m2 (FIG. 13).

RESULTS

Figure 16:
FIG. 16. Trees with doses #1 and #2.

It was determined that the trees where doses #1 and #2 were applied, both infected and healthy, did not present any effect since they ended up dying from the affectation (FIG. 16).

Figure 17:
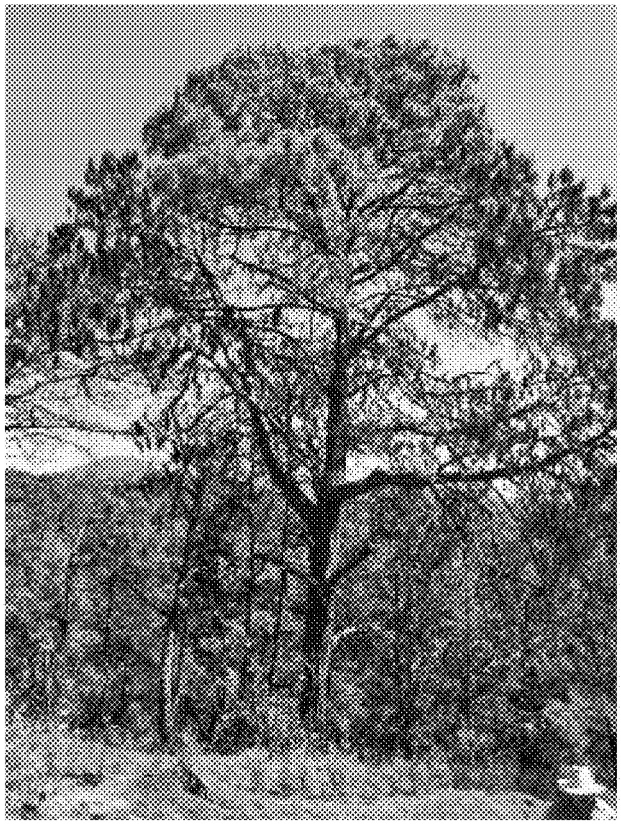
FIG. 17. Infested tree with dose 3.

In infected trees where dose #3 was applied there was a clear and evident slowdown in death from affectation. However, most ended up dying and others are in an advanced state of decay (FIG. 17).

Figure 18:
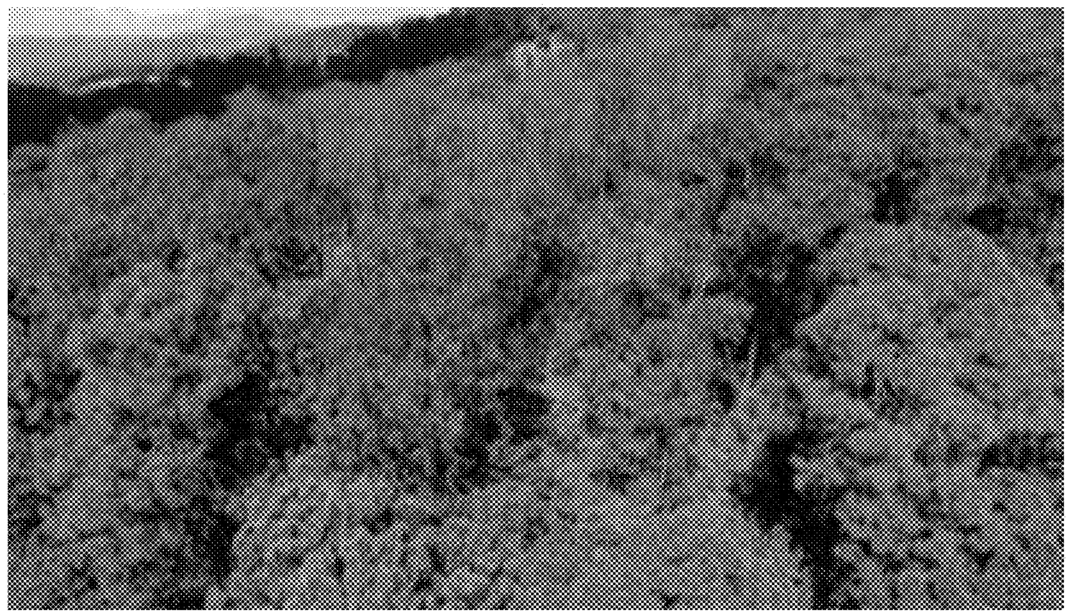
FIG. 18. View of trees with and without treatment.

In healthy trees that were given dose #3, adjacent to infected trees, no presence of *Dendroctonus* was detected, and they present a state of vigorous health (FIG. 18).

Areas with healthy trees that were treated with dose #3 had no *Dendroctonus* attacks. Likewise, it was noted that the progress of the infestation stopped when it reached the trees where dose #3 was applied. (FIG. 18).

DISCUSSION AND CONCLUSIONS

With the above results it can be concluded that the mixture of Levonorgestrel-Ethinylestradiol applied to uninfected trees has a protective effect which repells *Dendroctonus*, and which can clearly be used as a control method in areas with infestations.

It was determined that the mixture of Levonorgestrel-Ethinylestradiol has a repellent and non-insecticidal effect since no dead *Dendroctonus* have been found in the area of treatment, they are simply no longer present.

The repellent effect is due to a process of inhibition of the Levonorgestrel-Ethinylestradiol mixture towards pheromones secreted by the female to attract males.

The difference between semiochemists and their components used in the traps for monitoring and control, and the Levonorgestrel-Ethinylestradiol mixture is that, in the first case, *Dendroctonus* is attracted to traps directly without this guaranteeing that nearby trees will not be infected (field studies have shown that traps alone capture approximately 40% of the *Dendroctonus*, leaving 60% in their daily activity). Additionally, the replacement of traps every 45 or 60 days is omitted.

On the other hand, with procedure of the Levonorgestrel-Ethinylestradiol mixture, all healthy trees (including those near infected trees) that have been treated according to the procedure will repel the presence of *Dendroctonus* avoiding imminent infection and felling of the tree.

It is important to mention that the cost of the means of prevention and or sanitation in force is much higher and apparently of scarce expected results compared to the Levonorgestrel-Ethinylestradiol mixture procedure which proved to be highly effective for the control of *Dendroctonus*.

REFERENCES

Armendáriz, T. and G. Zúñiga. 2017. Illustrated key to species of genus *Dendroctonus* (Coleoptera: Curculionidae) occurring in Mexico and Central America. Journal of Insect Science 17(2): 1-15.

Arriaga, L., J. M. Espinoza, C. Aguilar, E. Martinez, L. Gómez y E. Loa (coordinadores). 2000. Regiones terrestres prioritarias de México. Comisión Nacional para el Conocimiento y Uso de la Biodiversidad. México.

Arriola Padilla, V. J. y otros, 2015. Evaluación de *Trichoderma* sp., como Agente de Control Biológic de *Dendroctonus* spp. Circulioinidae: Scolytinidae) en la Sierra Gorda de Querétaro, México, México: INIFAP.

Bentz, B. J., J. Régnière, C. J. Fettig, E. M. Hansen, J. L. Hayes, J. A. Hicke, R. G. Kelsey, J. F. Negrón and S. J. Seybold. 2010. Climate change and bark beetles of the western Unites States and Canada: direct and indirect effects. BioScience 60(8): 602-613.

Castro, J. 1981. Contribución al estudio de la biologia del defoliador de pino Neodiprionfulviceps (Cresson) complex (Hymenoptera: Diprionidae) en el estado de Chihuahua. Revista Ciencia Forestal 30(6): 43-51.

Cibrián, T. D.; T. Méndez M.; R. Campos B.; H. O. Yates III y J. Flores L. 1995. Insectos Forestales de México/Forest insects of México. (COFAN/NAFC) Publicación No. 6. Primera Edición.

Universidad Autónoma Chapingo. Texcoco, Estado de México. P 266-363.

Cibrián T., D., A. Lagunes T., H. Bravo M., J. L. Carrillo-Sánchez, C. Sosa M. y J. Vera G. 1998. Control de insectos de conos y semillas de árboles forestales. Revista Chapingo. Serie: Ciencias Forestales y del Ambiente 4(2): 285-296.

CONANP, 2012. Cartel de Sanidad Forestal, México: s.n.

Coulson, R. & Witter, J., 1990. Entomologia Forestal: ecologia y control. México, D. F.: Limusa S. A. de C. V.

Dawson, B., and M. Spannagle. 2009. Te Complete Guide to Climate Change. Routledge, New York 436 p.
Del Val, E. y R. Sáenz 2017. Insectos descortezadores (Coleoptera: Curculionidae) y cambio climático: problemática actual y perspectivas en los bosques templados. TIP Revista Especializada en Ciencias Quimico-Biológicas 20(2): 53-60.
Escobar, J. L., 2012. Evaluación del grado de infestación por plagas y plantas parásitas en el bosque templado del parquet nacional nevado de Toluca, México. Catacamas 49 Olancho, Honduras: TESIS COMO REQUISITO PREVIO A LA OBTENCIÓN DEL TÍTULO DE LICENCIADO EN RECURSOS NATURALES Y AMBIENTE.
FAO, 2009. Global review of forest pests and diseases, Roma: FAO.
FAO, 2016. El Estado de los Bosques del Mundo 5 2016. Los bosques y la agricultura: desafíos y oportunidades con relación a los usos de tierra., Roma: FAO.
Gernandt, David S. y Jorge A. Pérez-de la Rosa, 2014. Biodiversidad de Pinophyta (coniferas) en México. Revista Mexicana de Biodiversidad, Supl. 85: S126-S133.
González G., E., F. Bonilla T., S. Quiñones B., G. Sánchez M., F. Tafoya R., M. P. España L., J. Lozano G. y S. Robles U. 2014. Gula para la identificación de moscas sierra de la familia Diprionidae presentes en el centro norte de México. INIFAP. Centro de Investigación Regional Norte Centro Campo Experimental Pabellón. Pabellón de Arteaga, Ags., México. 36p.
Hernandez M., G., J. C. Soto C., V. H. Cambrón S. y I. Avilés C. 2017. Explosion de la abundancia de descortezadores, un acontecimiento adelantado a la primavera en el bosque de pino en Hidalgo. Entomologia Forestal 4: 425-530.
Iñiguez Higuera, G., 1999. Sistemas de clasificación de riesgo para *Dendroctonus frontalis* y *D. mexicanus* en "El Manzano" en Villa de Santiago, Nuevo León, México. Tesis de Maestria para obtener el grado de Maestro en Ciencias Forestales. Linares; Nuevo León: Universidad Autónoma 5 de Nuevo León.
Madaleña, 1991. Plagas y Enfermedades Forestales en América Central. Costa Rica: CATIE.
Moser, J. C., B. A. Fitzgibbon y K. D. Klepzig. 2005. The Mexican pine beetle, *Dendroctonus mexicanus* (Coleoptera: Curculionidae): First record in the United States and coocurrence with southern pine beetle, *Dendroctonus frontalis* (Coleoptera: Curculionidae). Entomological News 116(4): 235-249.
Nikolov, C. y otros, 2014. Post-disaster Forest Management and Bark Beetle Outbreak in Tatra National Park, Slovakia. BiOne, pp. 326-335.
Parmesan, C. 2006. Ecological and evolutionary responses to recent climate change. Ann. Rev. Ecol. Evol. Syst. 37: 637-669.
Perry, J. P., 1991. Especies de Escarabajos de la Corteza del Pino en Mexico Central. Unasylva, 5(4), p. 5.
Ramirez-Herrera C., J. J. Vargas-Hernández, y J. López-Upton. 2005. Distribución y conservación de las poblaciones naturales de *Pinus* greggii. Acta Bot. Mex. 72: 1-16.
Hernández M., G., J. C. Soto C., V. H. Cambrón S. y I. Avilés C. 2017. Explosion de la abundancia de descortezadores, 5 un acontecimiento adelantado a la primavera en el bosque de pino en Hidalgo. Entomologia Forestal 4: 425-530.
Rodriguez L., R. 1982. Plagas forestales y su control en México. Departamento de Parasitologia, Universidad Autónoma de Chapingo. Texcoco, Estado de Mexico. p 01-89.
Rodríguez, O. A., Equihua, M. A., Cibrián, T. J. & Estrada, V.E. G., 2010. Fluctuación de *Dendroctonus* adjunctus Blandford (CURCULINOIDAE: SCOLYTINAE) y sus depredadores atraidos por frontalina+alfa-pineno, en la estación experimental de Zoquiapan Edo. de México. Boletin del Museo de Entomologia de la Universidad del Valle, Issue 11, pp. 20-27.
Rzedowski (1978). Vegetación de México. Limusa, Mexico, D.F. 504 p.
Salinas Moreno, Y. y otros, 2010. Atlas de Distribución Geográfica de los Descortezadores del género *Dendroctonus* (Curculionidae: Scolytinae) en México, México: CONAFOR.
Sánchez-González, A. 2008. Una visión actual de la diversidad y distribución de los pinos de Mexico. Madera y Bosques 14: 107-120
Sánchez S., J. A.; L. M. Torres E.; A. Cano P. y O. U. Martinez B. 2003. Daños y diversidad de insectos 5 descortezadores de coniferas del noreste de México. Ciencia Forestal, Vol. 28 (93): 41-56.
Sánchez Salas, J. A. & Tones Espinosa, L. M., 2007. Biologia y Hábitos del Descortezador *Dendroctonus mexicanus* Hopkins y Estrategias de Control en *Pinus teocote* en Nuevo León, Saltillo, Coahuila: INIFAP.
Secretaria de Medio Ambiente y Recursos Naturales (Semarnat). 2015. Sistema Nacional de Información Ambiental y de Recursos Naturales—SNIARN. Comision Nacional Forestal; Gerencia de Sanidad Forestal.
Tkacz, B. M. y otros, 1998. Pest Risk Assessment of the Importation into the United States of Unprocessed *Pinus* and Abies Logs from México. Primera ed. Madison, Wisconsin: The United States Department of Agriculture.
Vazquez Collazo, I., Villa Rodriguez, A. & Madrigal Huendo Marisol, 2006. Los Muérdagos (Loranthaceae) en Michoacan. Primera. Uruapan, Michoacán: INIFAP.
Walther, G. R. 2010. Community and ecosystem responses to recent climate change. Philos. Trans. R. Soc. Lond. B. Biol. Sci. 365: 2019-2024.
Wood, S. L. 1982. The bark and ambrosia beetles of North and Central America (Coleoptera: Scolytidae). Great Basin Naturalist Memoirs 6:1-1359.
Woodward, F. I. 1987. Climate and Plant Distribution. Cambridge University Press, Cambridge. UK. 177 p.

Having described the invention above, the following claims are claimed as as property:

1. A mixture comprising levonorgestrel and ethinylestradiol in a dose of 0.45 mg levonorgestrel and 0.09 mg ethinylestradiol for pest control.

2. A method for repelling infestations of bark beetles of genus *Dendroctonus*, comprising the following steps:
a) identifying and selecting an area to be treated; and
b) inoculating healthy trees with a mixture comprising 0.45 mg of levonorgestrel and 0.09 mg of ethinylestradiol per tree.

3. The method according to claim 2, wherein the mixture is in tablet form and is introduced to the tree through a hole.

4. The method according to claim 2, wherein step b) comprises the following steps:
drilling a hole 2 to 2.5 cm deep per healthy tree with a diameter less than 20 cm and a hole of 4 to 5 cm deep for trees with a diameter greater than 20 cm;
inserting the mixture; and
covering the hole with moist soil.

* * * * *